US008401985B2

(12) United States Patent
Bickel et al.

(10) Patent No.: US 8,401,985 B2
(45) Date of Patent: Mar. 19, 2013

(54) HIERARCHY DETERMINATION FOR POWER MONITORING SYSTEMS

(75) Inventors: Jon A. Bickel, Murfreesboro, TN (US);
Ronald W. Carter, Murfreesboro, TN (US); Amjad Hasan, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 406 days.

(21) Appl. No.: 12/741,544

(22) PCT Filed: Nov. 5, 2007

(86) PCT No.: PCT/US2007/023236
§ 371 (c)(1),
(2), (4) Date: Aug. 18, 2010

(87) PCT Pub. No.: WO2009/061291
PCT Pub. Date: May 14, 2009

(65) Prior Publication Data
US 2010/0306151 A1 Dec. 2, 2010

(51) Int. Cl.
*G06N 5/00* (2006.01)
(52) U.S. Cl. .......................................... 706/46; 706/45
(58) Field of Classification Search .................... 706/46, 706/45
See application file for complete search history.

(56) References Cited

U.S. PATENT DOCUMENTS

| 7,272,518 B2 | 9/2007 | Bickel |
| 2007/0005275 A1 | 1/2007 | Bickel |

FOREIGN PATENT DOCUMENTS

WO   WO2007/027086   3/2007

OTHER PUBLICATIONS

Poy, et al., The Detector Control System of the ATLAS Experiment, Journal of Instrumentation, 2008, pp. 1-43.*
Markert, et al., High-Level Model of an Acceleration Sensor With Feedback as Part of an Inertial Navigation System, First International Conference on Sensing Technology, pp. 191-195.*
PCT/US2007/023236 Search Report, Dated Feb. 5, 2009 (5 pages).

* cited by examiner

*Primary Examiner* — Wilbert L Starks
(74) *Attorney, Agent, or Firm* — Nixon Peabody LLP

(57) ABSTRACT

A method of automatically learning how multiple devices are directly or indirectly linked in a monitoring system, comprises determining configuration parameters for the multiple devices in said system, receiving data measured by the devices, and grouping the devices into multiple segments according to at least one type of information selected from the group consisting of configuration parameters and data measured by said devices. Potential relationships of the devices in each segment are determined according to at least one type of information selected from the group consisting of configuration parameters and data measured by the devices, the hierarchies of the devices within individual segments are determined, and the hierarchies of the top-most device or devices in the segments are determined.

16 Claims, 27 Drawing Sheets

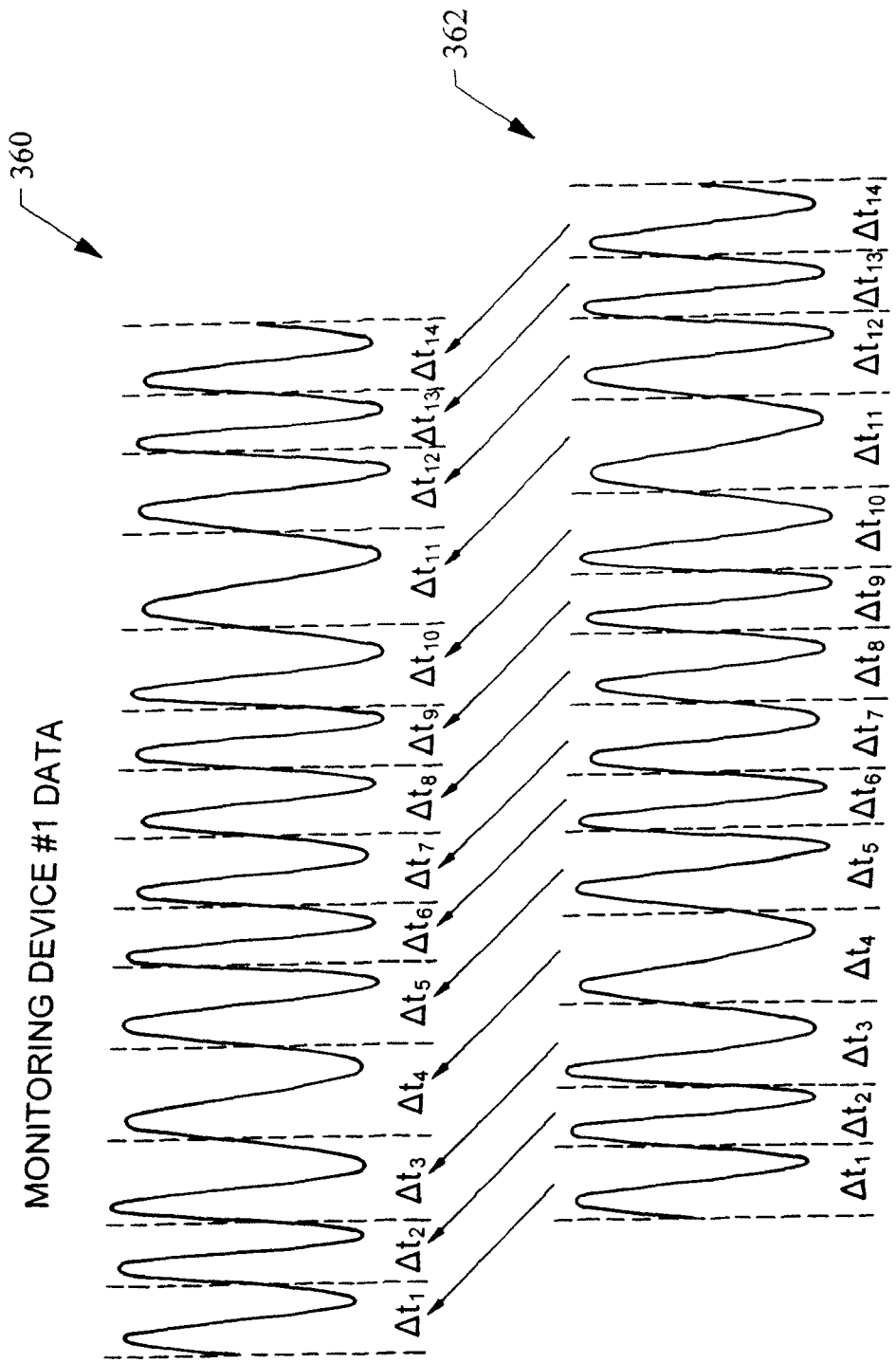

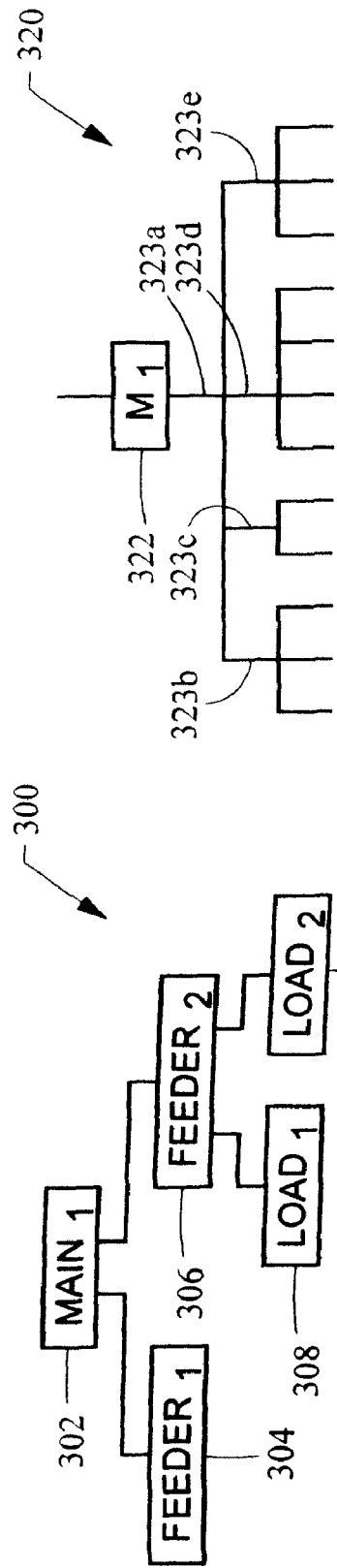
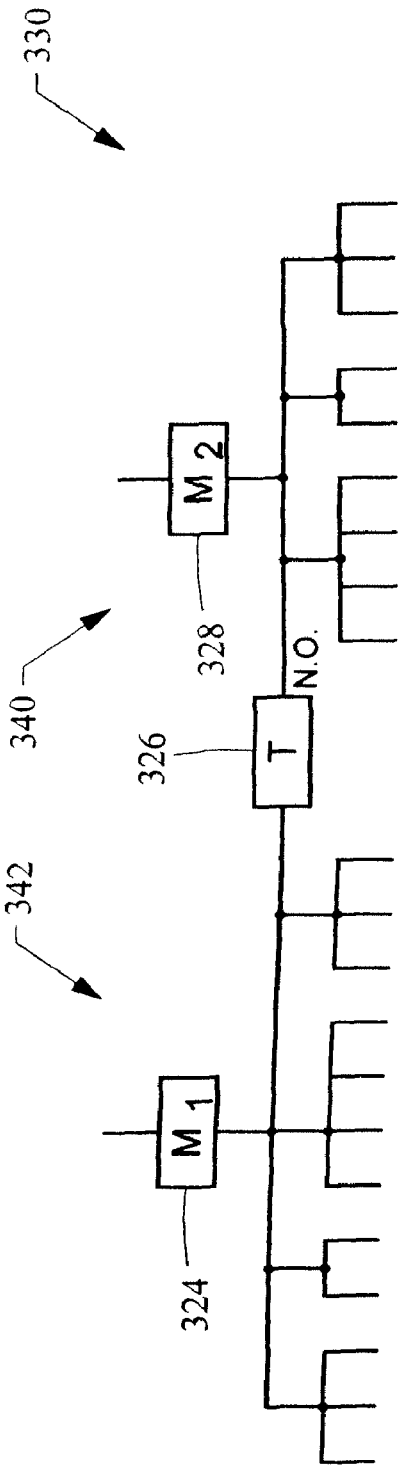
Fig. 7
Fig. 6
Fig. 8

HIERARCHY DETERMINATION FOR POWER MONITORING SYSTEMS

CROSS REFERENCE TO RELATED APPLICATIONS

This application is a U.S. national phase of International Application No. PCT/US2007/023236 filed Nov. 5, 2007, which is incorporated by reference in its entirety.

FIELD OF THE INVENTION

The present invention relates generally to utility monitoring systems, and, in particular, to automated precision alignment of data, automated determination of power monitoring system hierarchy, and automated integration of data in a utility monitoring system.

BACKGROUND OF THE INVENTION

Since the introduction of electrical power distribution systems in the late $19^{th}$ century, there has been a need to monitor their operational and electrical characteristics. The ability to collect, analyze, and respond to information about the electrical power system can improve safety, minimize equipment loss, decrease scrap, and ultimately save time and money. To that end, monitoring devices were developed to measure and report such information. With the dawn of the electronics age, the quality and quantity of data from monitoring devices was vastly improved, and communications networks and software were developed to collect, display and store information. Unfortunately, those responsible for evaluating data from monitoring devices are now overwhelmed by information from their monitoring systems. In the endeavor to maximize the usefulness of a monitoring system, monitoring equipment manufacturers are seeking methods of presenting information in the most useful format.

Effectively monitoring today's electrical power distribution systems is cumbersome, expensive, and inefficient. Electric power monitoring systems are typically arranged in a hierarchy with monitoring devices such as electrical meters installed at various levels of the hierarchy (refer to FIG. 2). Monitoring devices measure various characteristics of the electrical signal (e.g., voltage, current, waveform distortion, power, etc.) passing through the conductors, and the data from each monitoring device is analyzed by the user to evaluate potential performance or quality-related issues. However, the components of today's electrical monitoring systems (monitoring devices, software, etc.) act independently of each other, requiring the user to be an expert at configuring hardware, collecting and analyzing data, and determining what data is vital or useful. There are two problems here: the amount of data to be analyzed and the context of the data. These are separate but related issues. It is possible to automate the analysis of the data to address the amount of data. But, in order to do this reliably, the data must be put into context. The independence of data between each monitoring device evaluating the electrical system essentially renders each monitoring device oblivious of data from other monitoring devices connected to the system being analyzed. Accordingly, the data transmitted to the system computer from each monitoring device is often misaligned in that data from each monitoring device on the system does not arrive at the monitoring system's computer simultaneously. There are two basic reasons for the temporal misalignment of data between monitoring devices: communications time delays and monitoring device timekeeping & event time stamping. It is then up to the user to analyze and interpret this independent data in order to optimize performance or evaluate potential quality-related concerns on the electrical system.

Sophisticated processing capabilities in digital monitoring devices allow large amounts of complex electrical data to be derived and accumulated from a seemingly simple electrical signal. Because of the data's complexity, quantity, and relative disjointed relationship from one monitoring device to the next, manual analysis of all the data is an enormous effort that often requires experts to be hired to complete the task. This process is tedious, complex, prone to error and oversight, and time-consuming. A partial solution has been to use global positioning satellite (GPS) systems to timestamp an event, but this approach requires that the user purchase and install additional hardware and data lines to link the monitoring devices together. And this solution still requires the evaluation of large amounts of data because the system is temporally in context; not spatially in context. Synchronizing data using GPS systems is also disadvantageous because of time delays associated with other hardware in the system. Loss of the signal from the GPS satellites renders this approach nonfunctional. Furthermore, any alignment of data by a GPS-based system can only be as accurate as the propagation delay of the GPS signal, which means that the data still may not be optimally aligned when a GPS system is used.

The addition of supplemental monitoring devices in the electrical system does nothing more than generate more information about the electrical system at the point where the meter is added in the electrical system, increasing complexity without any benefit. Any usefulness of the data is generally limited to the locality of the monitoring device that was added, while even more data is amassed.

The complexity of many electrical systems usually necessitates an involved configuration process of monitoring systems because each metered point in the electrical system has different characteristics, which is why multiple monitoring devices are installed in the first place. As a result of the enormous volume of complex data accumulated from electrical monitoring systems heretofore, a thorough analysis of the data is typically not feasible due to limited resources, time, and/or experience.

Temporal alignment of the data is one important aspect to understand and characterize the power system. Another important aspect is having a thorough knowledge of the power monitoring system's layout (or hierarchy). Power monitoring devices measure the electrical system's operating parameters, but do not provide information about how the parameters at different points on the power monitoring system relate to each other. Knowing the hierarchy of the power monitoring system puts the operating parameters of multiple monitoring devices into context with each other.

To determine the layout of a power monitoring system, a user must review electrical one-line drawings or physically perform an inventory of the electrical system if one-line drawings are unavailable. The user manually enters the spatial information into the monitoring system software for analysis. When a new device or monitored load is added or moved within the power monitoring system, the user must manually update the monitoring system software to reflect the new addition or change.

Data alignment and layout information are essential to understanding and characterizing the power system. With these two pieces of information, the data from each meter can be integrated and put into context with every other meter in the power system. Heretofore, the only techniques for passably integrating data were complex, expensive, manually intensive, and time-consuming for the user. These techniques also permit only limited integration of data and require additional hardware (such as GPS hardware), data lines, and supplemental monitoring device accessories.

SUMMARY OF THE INVENTION

Briefly, according to an embodiment of the present invention, a method of automatically learning how multiple devices are directly or indirectly linked in a monitoring system, comprises determining configuration parameters for the multiple devices in said system, receiving data measured by the devices, and grouping the devices into multiple segments according to at least one type of information selected from the group consisting of configuration parameters and data measured by said devices. In one implementation, potential relationships of the devices in each segment are determined according to at least one type of information selected from the group consisting of configuration parameters and data measured by the devices, the hierarchies of the devices within individual segments are determined, and the hierarchies of the top-most device or devices in the segments are determined. The configuration parameters include at least one parameter selected from the group consisting of (a) active demand synchronization pulses, (b) communication configurations, (c) scaling factors, (d) VT/CT ratios, (e) meter type and (f) system frequency, and the data measured by the devices includes at least one parameter selected from the group consisting of power, voltage, waveform distortion, sequential components, flicker levels and temperatures.

According to another embodiment of the present invention, a method of automatically positioning devices with similar characteristics in a hierarchical representation of multiple devices in a monitoring system comprises identifying devices that have substantially the same characteristics according to at least one type of information selected from the group consisting of configuration parameters and data measured by the devices, and positioning the identified devices at the same point in the hierarchy of the multiple devices in the power monitoring system. In one implementation, data from the identified devices is sampled and the devices are placed in a logical sequential order according to the sampled data.

According to a further embodiment, a method of automatically linking two devices in a hierarchical representation of multiple devices in a monitoring system when the two devices are not linked because of discrepancies in the magnitudes of data measured by the two devices, comprises receiving time-series data from the two devices and determining the difference between the time-series data for the same time or time interval, determining a correlation coefficient between the two devices, and linking the two devices in the hierarchical representation if the correlation coefficient exceeds a predetermined threshold and the difference falls within a predetermined tolerance range, is satisfied.

In yet another embodiment, a method of reconciling the amount of power consumed with the amount of power delivered in a power distribution system having multiple paths equipped with a power monitoring system, comprises measuring the amount of power and energy delivered to the power distribution system, measuring the amount of power and energy consumed within the multiple paths in the power distribution system, increasing the measured amount of power consumed by a predetermined percentage of that amount to account for typical losses and inaccuracies in the power distribution system, thereby producing an adjusted amount of power consumed, subtracting the adjusted amount of power consumed from the measured amount of power delivered to determine an amount of residual power, and reporting the amount of residual power to the user of the power distribution system so that the user can allocate the amount of residual power among unmonitored loads served by the power distribution system. In one implementation, the amount of residual power is reported as a measurement by a virtual power meter.

In still another embodiment, a method of collecting data from multiple devices in a monitoring system for use in determining the hierarchy of the devices, comprises receiving measurements of at least one parameter from the devices at a controllable sampling rate, determining the rate of change of the parameter, and adjusting the sampling rate for the devices according to changes in the parameter. In one implementation of this embodiment, the sampling rate is increased for the devices as the rate of change of the parameter measured by at least one of the devices increases, and is decreased for the devices as the rate of change of the parameter measured by the at least one device decreases.

A further embodiment provides a method of collecting data from multiple devices in a monitoring system for use in determining the hierarchy of the devices, comprising receiving data measured by the devices and using that data to determine the hierarchy of the devices successively, determining the number of changes in successive hierarchy determinations, and adjusting the time intervals between successive hierarchy determinations according to the number of changes in successive hierarchy determinations. In one implementation of this embodiment, the time between successive determinations is increased as the number of changes in successive determinations increases, and is decreased as the number of changes in successive hierarchy determinations decreases.

Another embodiment provides a method of determining the hierarchy of multiple devices in a monitoring system, comprising initially placing a first device in the hierarchy based on (a) a first correlation coefficient for the first device and a second device that is a potential parent of the first device and (b) data measurements from the first and second devices, subtracting data received from the first device from data received from the second device, and then determining a second correlation coefficient for the first and second devices, and comparing the first and second correlation coefficients and, if the degree of correlation decreases, comparing the first correlation coefficient with a predetermined threshold value to determine whether the placement of the first device is correct. In one implementation, correlation coefficients for the first device and other potential parent devices are subsequently determined, and each subsequently determined correlation coefficient is compared with the first correlation coefficient for the first and second devices, and changing the placement of the first device if at least one of the subsequently determined correlation coefficients indicates a greater degree of correlation than the first correlation coefficient for said first and second devices.

Orphan devices that are not placed within the hierarchy may be reported to the user of the monitoring system so that the user can place the orphan device at its actual installed location within the hierarchy, and then connected to other devices within the hierarchy according to the user's placement. In a modified embodiment, identifying at least one orphan device that is not placed within the hierarchy, the orphan device may be placed in a separate system and reported to the user of the monitoring system so that the user can place the orphan device at its actual installed location within the hierarchy, and the user is provided with a recommended placement of the orphan device within the hierarchy based on at least one type of information selected from the group consisting of configuration parameters and data measured by the orphan device.

In a further embodiment, a method of determining the hierarchy of multiple devices in a power monitoring system, comprises receiving from the devices at least one type of information selected from the group consisting of configuration parameters and data measured by the devices, determining the existence and location of at least one power system component based on received data measured by the devices, and placing the power system component within the hierarchy of the devices. In one implementation, the power system component is a transformer, nominal primary and secondary voltages for the transformer are determined from the voltage data from a pair of the devices, and the transformer with those nominal primary and secondary voltages is placed within the hierarchy between the pair of devices.

Yet another embodiment provides a method of evaluating proposed modifications to a hierarchical representation of multiple devices in a monitoring system, comprising receiving a proposed modification to a device in a hierarchical representation of multiple devices in a monitoring system, and evaluating the correlation coefficient between the modified device and at least one adjacent device in the hierarchical representation to determine whether the proposed modification requires further revision of the hierarchical representation. In one implementation, a parent of the modified device is identified, and then the correlation between the modified device and the parent is evaluated. In one implementation, an orphan device that cannot be placed within the hierarchical representation is identified and reported to the user of the monitoring system so that the user can select a location for the orphan device within the hierarchy. The user then selects a location for the orphan device in the hierarchical representation, and the correlation between the orphan device and a parent of the orphan device when placed in the selected location within the hierarchical representation is evaluated to determine whether the selected location is correct.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 4 are exemplary frequency data samples from two aligned monitoring devices;

FIG. 6 is a functional block diagram of a simplified hierarchy with a single main and two feeders;

FIG. 7 is an exemplary diagram of a single radial-fed system;

FIG. 8 is an exemplary diagram of a multiple radial-fed system;

FIGS. 9-11A is a flow chart diagram of an auto-learned hierarchy algorithm;

Figure 1:
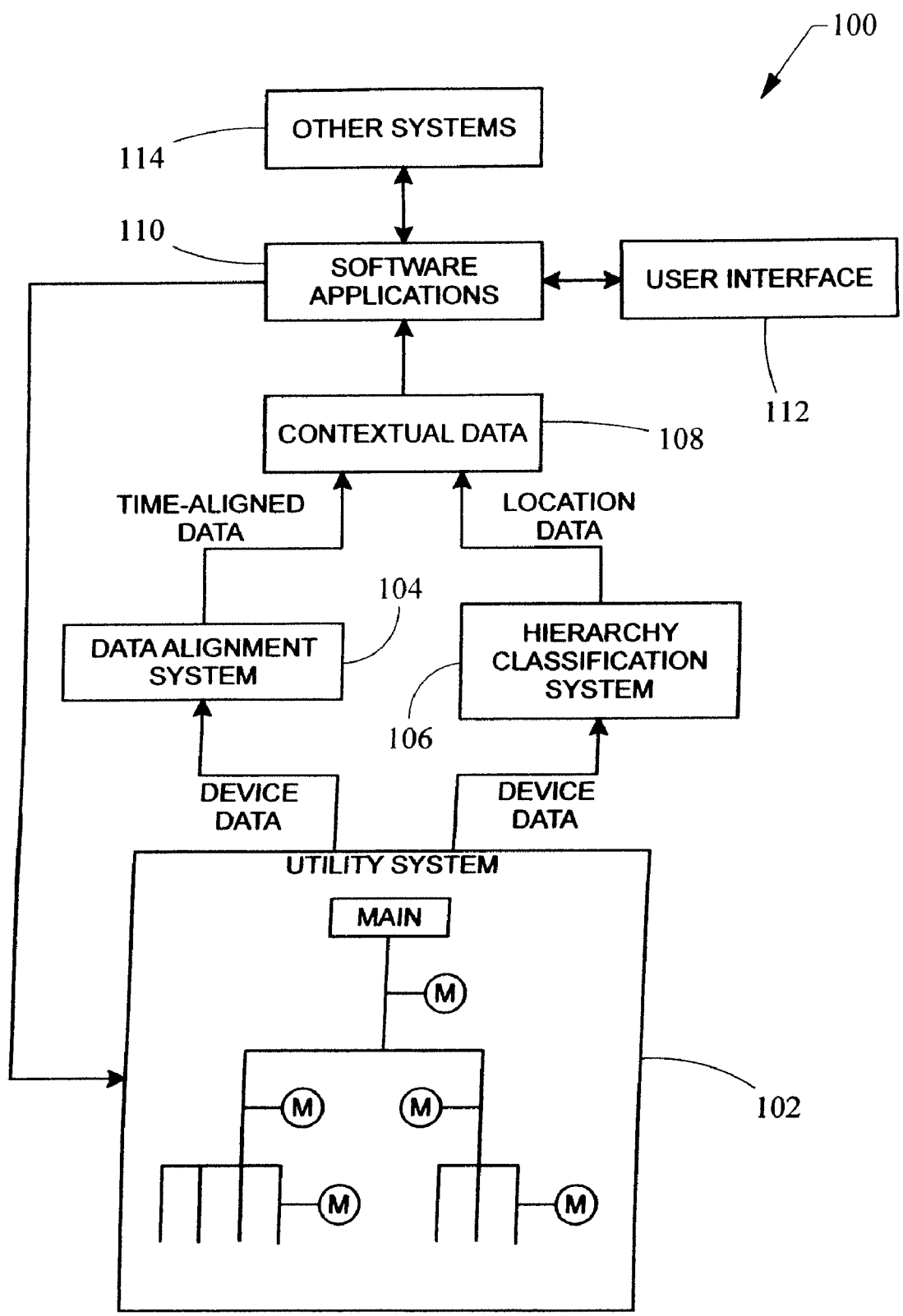
FIG. 1 is functional block diagram of an automated data integration monitoring system.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to FIG. 1, an automated data integrated monitoring system 100 is generally shown. A utility system 102 having multiple monitoring devices M provides data from each monitoring device M that is communicated to an automated data alignment system 104 and an automated hierarchy classification system 106. The data is aligned automatically in the automated data alignment system 104 in accordance with the present invention and produces data that is aligned such that it represents the data when it was actually seen simultaneously by the monitoring devices M in the power monitoring system 102. The hierarchy classification system 106 automatically learns the hierarchy of monitoring devices present in the utility system 102 and their relationships relative to one another.

Once the data from each monitoring device M is aligned and each monitoring device's location is known, the data is said to be in context 108. The contextual data 108 can be used by software applications 110 to provide and diagnose useful information about the utility system 102 beyond what is generally available if the data is not in context. The utility being monitored in the utility system 102 can be any of the five utilities designated by the acronym, WAGES, or water, air, gas, electricity, or steam. Each monitoring device measures characteristics of the utility system, and quantifies these characteristics into data that can be analyzed by a computer.

A user interacts with the software applications 110 via a conventional user interface 112. The software applications 110 can be linked to other systems 114, such as a billing system, and use the contextual data 108 to communicate messages between the other systems 114 and the user interface 112.

The data alignment system 104 aligns data, such as voltage, current, time, events, and the like, from multiple monitoring devices M in a utility system, and is a valuable tool for users. When data from all the monitoring devices M is aligned to the same point in time that the data occurred, the data can be put into a temporal context from which additional decisions regarding hardware and software configuration can be automatically made or recommended. As used herein, a monitoring device refers to any system element or apparatus with the ability to sample, collect, or measure one or more operational characteristics or parameters of a utility system 102. When the utility system 102 is a power monitoring system, the monitoring device M can be a meter that measures electrical characteristics or parameters of the power monitoring system.

The data alignment techniques (which are detailed below) accomplish at least the following:

1) Automated alignment of data in monitoring devices;
2) Automated synchronization of time in monitoring devices;
3) Alignment of data and time in monitoring devices located at different points on the power utility grid (where the monitoring system software may obtain time data from the Internet or another server); and
4) Diagnosing misidentification or mislabeling of phases throughout the electrical power system.

All real-world electrical signals in power systems experience subtle variations in their frequency and amplitude over time. This variation of the signal's frequency and amplitude are both indeterminate and unique with respect to time. Each monitoring device located on the same utility grid will simultaneously experience the same frequency variations. Analysis of data from monitoring devices that are directly linked to each other in the hierarchy will reveal a correlation in their amplitude variations. Analysis of both the frequency and amplitude variations of the signal are then used to precisely align the data of one monitoring device with respect to another device (or all the monitoring devices to each other) in the data alignment system 104. The details of the data alignment system 104 are, discussed below.

The data alignment techniques allow all monitoring devices M in a power utility system hierarchy to be aligned to the zero-crossing of all three phase voltages without the use of additional hardware. The system also anticipates potential phase shifts between various monitoring devices, for example, those caused by certain transformer configurations. Once the data of the monitoring devices are aligned with each other, the system data is essentially aligned with respect to the time it occurred, making more complex data analyses feasible.

Figure 2:
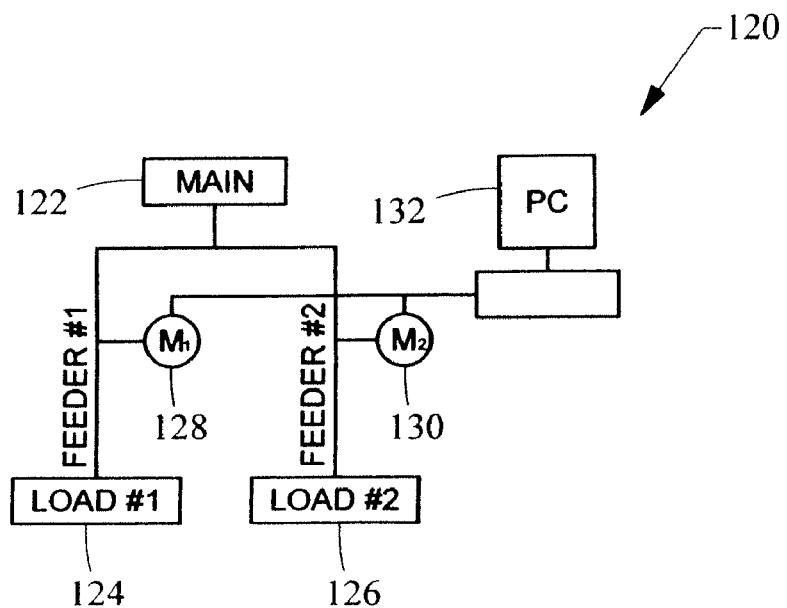
FIG. 2 is a functional block diagram of a, simplified power monitoring system.

A simplified configuration of a power monitoring system 120 is shown in FIG. 2. The power monitoring system 120 includes a main 122 connected to a first load 124 by a first feeder and to a second load 126 by a second feeder. Monitoring devices 128, 130 measure electrical characteristics or parameters associated with the first and second feeders, respectively. Each monitoring device 128, 130 is communicatively coupled to a computer 132.

Figure 3:
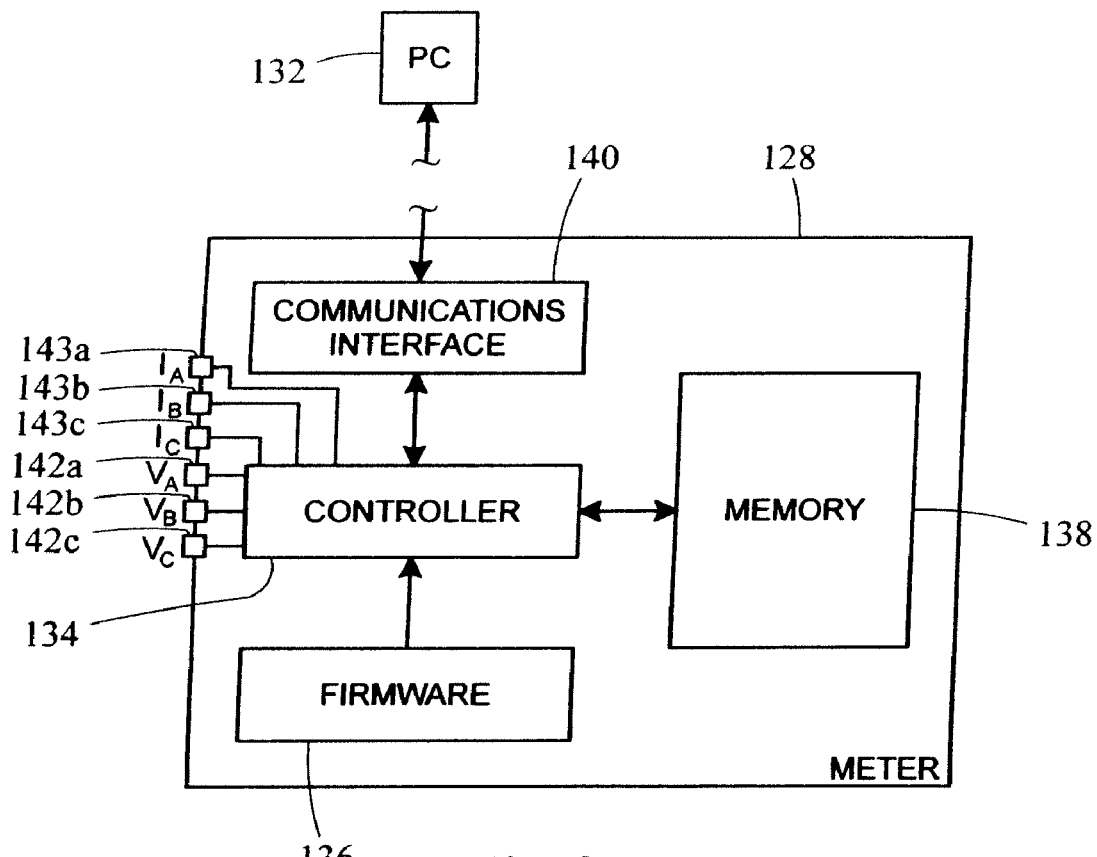
FIG. 3 is a functional block diagram of a monitoring device.

The first monitoring device 128 can be a power meter (or electric meter), such as shown in FIG. 3. The monitoring device 128 includes a controller 134, firmware 136, memory 138, a communications interface 140, and three phase voltage conductor connectors 142a,b,c, which connect to the $V_A$, $V_B$, and $V_C$ phase voltage conductors, respectively, and are coupled to the controller 134. Three phase current conductor connectors 143a,b,c, which connect to the $I_A$, $I_B$, and $I_C$ phase current conductors, respectively, are optionally coupled to the controller 134. The firmware 136 includes machine instructions for directing the controller to carry out operations required for the monitoring device. Memory 138 is used by the controller 134 to store electrical parameter data measured by the monitoring device 128.

Instructions from the computer 132 are received by the monitoring device 128 via the communications interface 140. Those instructions include instructions that direct the controller 134 to mark the cycle count, to begin storing electrical parameter data, or to transmit to the monitoring system software 132 electrical parameter data stored in the memory 138. The electrical parameter data can include any data acquired by monitoring devices, including any combination of frequency variations, amplitude variations, and phase variations.

An algorithm is used to precisely, automatically, and temporally align the data from multiple monitoring devices to the same voltage zero-crossing. Other data alignment aspects discussed below are based on this capability. The data alignment is facilitated by functionality in both the monitoring device 128 and the monitoring system software running on the computer 132, and the requirements of each will be discussed individually. Collection and partial analysis of data is performed in the monitoring device 128.

From the time the monitoring device 128 is energized, a cycle count is performed of the measured voltage signals. The cycle count is sequentially iterated with each positive voltage zero-crossing (or, alternately, with each negative voltage zero-crossing). As the monitoring device 128 measures both the frequency and amplitude variations of the voltage and current from cycle to cycle, a comparison is performed to their respective nominal values. The frequency and amplitude variations and associated cycle count are tracked by the device firmware 136. The associated monitoring device time at any specified cycle count can be stored in the memory 138.

The monitoring system software executed by the computer 132 initiates alignment of the data associated with multiple monitoring devices by sending a global command to all monitoring devices 128, 130 on the power monitoring system 120 to mark their cycle count, time and buffer a predetermined amount of cycle-by-cycle data.

This predetermined amount of data is established based on the number of monitoring devices in the power monitoring system, the communications time delays in the power monitoring system and the magnitude of frequency and amplitude variations. When the buffering is complete, the monitoring devices 128, 130 transmit their buffered data to the computer 132.

Once the data is collected by the monitoring devices 128, 130, the monitoring system software uploads the buffered data for analysis. There will likely be a time offset in each monitoring device's buffered data because the monitoring devices on the system will likely not begin buffering the data simultaneously due to communications time delays in the power monitoring system and internal time delays within the monitoring devices. The buffered data is analyzed by the monitoring system software on the computer 132 to locate the highest correlation in frequency between all the monitoring devices 128, 130. Generally, the highest correlation is located by sliding the buffered frequency data in one monitoring device with respect to another until the frequency variations line up with each other as shown in FIG. 4.

The frequency data 360 for the monitoring device 128 is "slid" relative to the frequency data 362 for the monitoring device 130 until the frequency data for each device line up. Thus, the zero-crossing associated with $\Delta t_1$ of monitoring device 128 is aligned with the zero-crossing associated with $\Delta t_1$ of monitoring device 130, the zero-crossing associated with $\Delta t_2$ of monitoring device 128 is aligned with the zero-crossing associated with $\Delta t_2$ of monitoring device 130, and so on. Cross-correlation algorithms for "sliding" two data sets relative to one another until they are aligned are discussed in further detail below in connection with FIGS. 5A and 5B.

Once the buffered data is aligned, the cycle count of the first monitoring device 128 is associated with the cycle count of the second monitoring device 130 in the software on the computer 132. The on-board monitoring device time may optionally also be aligned or associated relative to one another. This process is repeated for each monitoring device in the power monitoring system 120 until all devices' cycle counts are associated with each other. During the data alignment process, the monitoring system software on the computer 132 builds a matrix of each device's cycle count and time with respect to each other and the time on the computer 132.

Although FIG. 2 shows a simplified power monitoring system 120 with just two monitoring devices 128, 130, the data alignment can be applied to any power monitoring system 120 of any complexity with multiple hierarchical levels, such as the one-line diagram shown in FIG. 7. For ease of illustration and discussion, only two monitoring devices 128, 130 have been discussed.

Once the data of the two monitoring devices 128, 130 is aligned relative to one another, there is typically no need to realign the data again unless a monitoring device loses its voltage signal or resets itself. In those cases, only the monitoring devices that lose their voltage signal or reset need to be realigned. The data alignment technique can be initiated by an event, such as an undervoltage or overvoltage condition, connecting or disconnecting a load to the power monitoring system, a change in the characteristics of the voltage, current, or a load, a monitoring device reset, or a power loss. The data alignment technique can also be initiated automatically by the monitoring software or manually by the user.

Figure 5A:
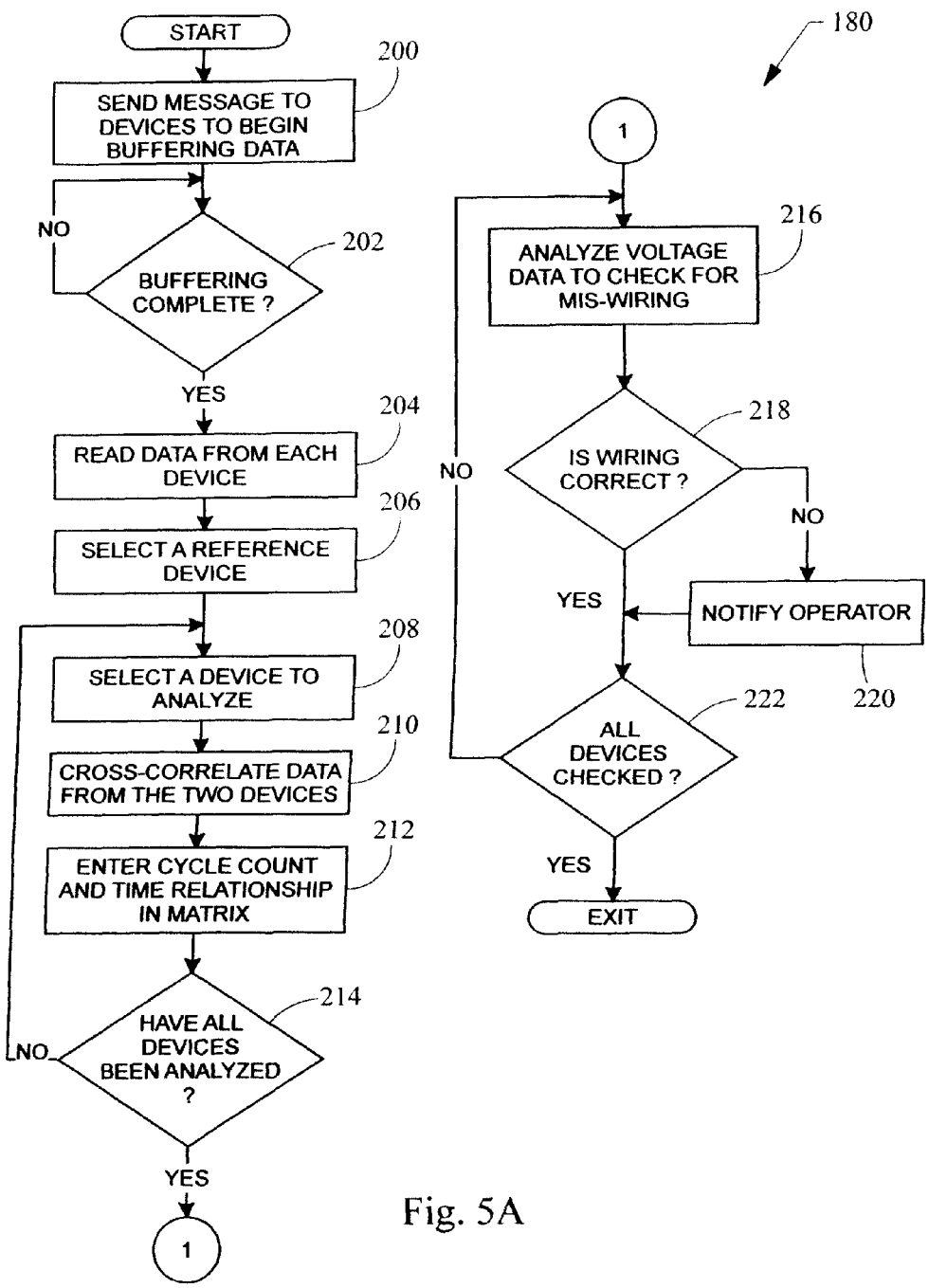
FIG. 5A is a flow chart diagram of a data alignment algorithm.

Turning now to FIG. 5A, a flow chart, which can be implemented as a data alignment algorithm 180 executed by the computer 132, is shown for carrying out a data alignment algorithm 180 begins by sending a message to the monitoring devices (such as monitoring devices 128, 130) to begin buffering data (200) until buffering is complete (202). The computer 132 reads the data from each device (204). The data represents, in an embodiment, electrical parameter data such as variations in (fundamental) frequency, variations in amplitude, and variations in phase. Preferably, the data represents variations in fundamental frequency. Fundamental frequency is a preferred criterion because it remains unchanged throughout the power monitoring system, even if transformers are present in the system. Amplitude and phases can shift when transformers are present in the system; however, the system described herein contemplates using amplitude and phase information as criteria.

The computer 132 selects a reference monitoring device (206) such as monitoring device 128 and then selects a monitoring device to analyze (208) such as monitoring device 130. Data from the monitoring devices 128, 130 is then cross-correlated (210), and each device's cycle count and time relationships are entered into a matrix (212). The cross-correlation is carried out by a conventional cross-correlation algorithm, preferably such as the one provided below in Equation 1.

$$r(d) = \frac{\sum_i [(x(i) - mx) * (y(i - d) - my)]}{\sqrt{\sum_i (x(i) - mx)^2} \sqrt{\sum_i (y(i - d) - my)^2}} \quad \text{(Equation 1)}$$

The correlation coefficient is represented by r(d), the delay (offset or shift) being represented by d, where $-1 <= r(d) <= 1$ for two series x(i) and y(i) representing the respective data from the monitoring devices 128, 130; and mx and my are the means of the corresponding series x(i) and y(i). According to an embodiment, the correlation algorithm is a circular correlation algorithm in which out-of-range indexes are "wrapped" back within range. In another embodiment, the correlation algorithm is a linear correlation algorithm in which each series is repeated. In still other embodiments, the correlation algorithm is a pattern-matching algorithm or a text-search algorithm.

After cross-correlation, the computer 132 checks whether all monitoring devices have been analyzed (214), and if so, proceeds to check the wiring of the phase conductors. In many instances, phase conductors may be misidentified throughout an electrical system by the contractor who installed them. For example, the phase that is identified as "A-phase" at the main switchgear may be identified as "B-phase" at the load. This nomenclature misidentification of the phase conductors can result in confusion, and even pose a safety hazard.

To mitigate this hazard, the computer 132 analyzes the voltage (or current) data by sampling data at the voltage (or current) zero-crossing of a reference channel on each monitoring device (216). The computer 132 determines whether the wiring is correct (218) by determining whether the values of the sampled data are zero, negative, or positive, and, based on those values, assigning phase notations (such as A, B, or C) for each reference channel. If all monitoring devices are identified accurately, the data values for Phase-A should be approximately zero. If the data values are negative, then the phase in question is the "B-Phase" for an ABC phase rotation. If the data values are positive, then the phase in question is the "C-phase" for an ABC phase rotation. The user is notified (220) whether the wiring is correct. Once the proper phase notation is determined for each monitoring device (222), the computer 132 may then allow the user to correct the misidentified phase notation in any or all monitoring devices. The phase diagnosis embodiments are applicable to voltage inputs as well as current inputs.

Figure 5B:
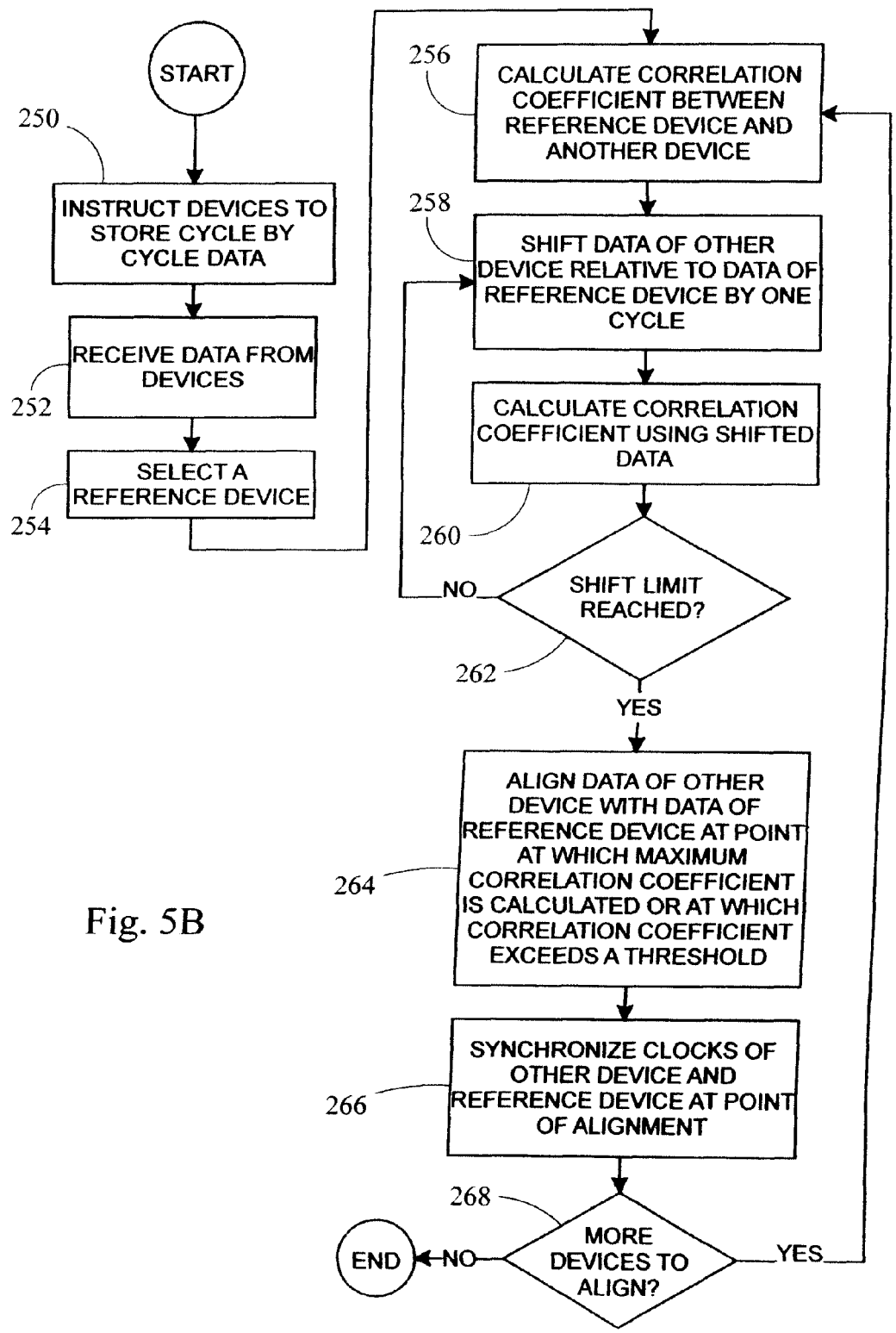
FIG. 5B is a flow chart diagram of a modified data alignment algorithm.

FIG. 5B illustrates a flow chart for carrying out a process in which a computer 132 instructs each monitoring device in the power monitoring system 120 to store data on a cycle-by-cycle a basis (250) for a predetermined number of cycles, preferably between about 1,000 and about 10,000 cycles. When a sufficient amount of data has been stored by the monitoring devices, the computer 132 receives the data from the monitoring devices (252) and selects a reference monitoring device (254). Using a convention cross-correlation algorithm such as Equation 1 above, the computer 132 calculates a correlation coefficient r(d) between at least a portion of the data (such as about 400 cycles) of the reference monitoring device and the data of a second monitoring device (256). The calculated correlation coefficient is stored, and the data of the second monitoring device is shifted relative to the reference device by one cycle (258).

As mentioned above, the out-of-range indexes can be wrapped back within range according to a circular correlation algorithm or the indexes can be repeated according to a linear correlation algorithm. A correlation coefficient is calculated using the shifted data (260) and if no further shifts are required (262), the data of the second monitoring device is aligned with the data of the reference device at the point at which the maximum correlation coefficient is calculated or at which the correlation coefficient exceeds a threshold value, such as 0.5 (264). It should be noted that when the correlation coefficient r(d) is close to 1.0, the algorithm can exit without conducting any further shifts.

The computer 132 synchronizes the clocks of the second monitoring device and the reference device at the point of alignment (266). The computer 132 reads the cycle count in each monitoring device and the associated monitoring device's on-board clock time. A monitoring device's on-board clock time and cycle count may drift with respect to each other due to the limitations of the on-board clock. Once the data is aligned, the cycle count is considered the absolute reference for a monitoring device. Due to the clock drift, it may be necessary to re-read the time associated with a device's cycle count periodically to reestablish the device's time. The software on the computer 132 will then update the matrix containing the monitoring device time information.

Another capability of this feature is to allow all on-board monitoring device clocks to be periodically reset to the same value to provide a standard time for the entire power monitoring system. Preferably, the time within the monitoring system software (running on the computer 132) is set according to some absolute time reference. Once the computer time is set, the monitoring system software resets the time on all the monitoring devices accordingly. In this embodiment, the data and time of each monitoring device and the software would be more accurately aligned with the absolute time reference.

When there are no further monitoring devices to align (268), the procedure ends. In an alternate embodiment, all of the monitoring device's data is aligned before the clocks are synchronized (266).

Another advantage of the data alignment techniques is the ability to align data and time on different points of the utility grid. If monitoring devices are located on two different points of the same utility grid, it is possible to align the monitoring devices together. In this embodiment, the monitoring devices at each geographic location are first aligned to each other. The software managing all the systems is then used as the absolute time reference for all systems, giving them all a common point of reference.

Referring back to FIG. 1, the integrated monitoring system 100 includes the hierarchy classification system 106. Having a thorough knowledge of an electrical power system's layout is essential to understanding and characterizing the system. Power meters typically provide only the electrical system's operating parameters, but do not give information on how the parameters at different monitoring points on the electrical system relate to each other. Having the hierarchy of an electrical system puts the operating parameters of multiple monitoring devices into spatial context with each other. This spatial context gives the user a more powerful tool to troubleshoot system problems, improve system efficiencies, predict failures and degradation, locate the source of disturbances, or model system responses.

The hierarchy classification system 106 allows the monitoring system software to collect data from the monitoring device on the utility system 102, and automatically determine the hierarchy of the utility system 102 with little or no user input. The level of detail given by the hierarchy classification system 106 directly correlates with the number and extent of monitoring devices in the utility system 102. As supplemental monitoring devices are added, the auto-learned hierarchical algorithm enables them to be automatically incorporated into the determined hierarchical structure.

A hierarchy of nodes is based on a relationship that determines that one node is always greater than another node, when the nodes are related. A hierarchy's relationship can link or interrelate elements in one of three ways: directly, indirectly, or not at all. An illustration of a direct link or interrelationship is shown in FIG. 6 between the $Load_2$ 310 and $Feeder_2$ 306. In contrast, an indirect link exists between $Load_2$ 310 and $Main_1$ 302. Finally, there is effectively no link between the $Load_1$ 308 and $Load_2$ 310 and between $Feeder_1$ 304 and $Feeder_2$ 306.

In the case of a power system hierarchy, an objective is to order elements in the power system so as to represent the true connection layout of the power system. Determining the hierarchy of a power system provides important information that can be used to solve problems, increase equipment and system performance, improve safety, and save money. The level of detail contained in a power system hierarchy will depend on both the number of elements or nodes that are being monitored and the node's ability to provide feedback to the auto-learned hierarchy algorithm in the monitoring system software running on the computer 132.

Generally, the hierarchy classification system 106 utilizes an auto-learned hierarchy algorithm in the monitoring system software that is based on rules and statistical methods. Periodically, the monitoring system software polls each monitoring device in the utility system 102 to determine certain characteristics or parameters of the utility system 102 at that node (represented by monitoring device M). Multiple samples of specified parameters are taken from each meter in the system at the same given point in time. Once the parameter data is collected from each node M in the utility system 102, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the utility system 102 is correct, the auto-learned hierarchy algorithm ends. The final layout of the utility system 102 is then presented to the user for concurrence. As each monitoring device's data is evaluated over time (the learning period) with respect to all other monitoring devices using the auto-learned hierarchy algorithm, a basic layout of the hierarchical structure of the utility system 102 is determined based on the monitoring points available. In this respect, the algorithm uses historical trends of the data from each monitoring device, and those trends are compared to determine whether any interrelationship (link) exists between the monitoring devices. A more detailed hierarchical structure can be determined with more monitoring points available for analysis.

A benefit of the auto-learned hierarchy algorithm is to provide automatically a basic hierarchical structure of a utility system being monitored with minimal or no input by the user. The hierarchy can then be used as a tool for evaluation by other systems 114. Another benefit is that the accuracy of the time synchronization between the monitoring devices and the monitoring system software is improved.

In an embodiment in which the utility system 102 is a power monitoring system, samples of specific electrical parameters (such as power, voltage, current, or the like) are simultaneously taken from each monitoring device in the power monitoring system. This parameter data is stored and analyzed with respect to the time the sample is taken, the associated value of the data point, and the monitoring device providing the data.

Data taken from each monitoring device in the power monitoring system is compared with each other to determine whether any correlation exists between the monitoring devices. The data is analyzed for statistical trends and correlations as well as similarities and differences over a predetermined period of time.

According to an embodiment, one or more rules or assumptions are used to determine the hierarchical order of the power system. Certain assumptions may have to be made about the utility system in order to auto-learn the utility system's hierarchy. The assumptions are based on Ohm's Law, conservation of energy, and working experience with typical power distribution and power monitoring systems.

General rules that may be made by the auto-learned hierarchy algorithm in connection with power systems and power monitoring systems may include or not include any combination of the following:

1. The power system being analyzed is in a single 320 (FIG. 7) or multiple radial feed configuration 330 (FIG. 8).
2. The meter measuring the highest energy usage is assumed to be at the top of the hierarchical structure (e.g., Main 322 shown in FIG. 7) taking into account inaccuracies in the meters.
3. The rate of sampling data by the meters is at least greater than the shortest duty cycle of any load.
4. Energy is not alternately consumed and generated on the power system during the parameter data collection process.
5. The error due to the offset of time in all meters on the power monitoring system is minimal where data is pushed from the monitoring device to the monitoring system software running on the computer 132.

Any combination of the following additional parameters may or may not be present for the auto-learned hierarchy algorithm:

1. Data is not collected for hierarchical purposes from two monitoring devices installed at the same point of a power system, though this parameter is not necessarily a requirement in all aspects disclosed herein.
2. Meters with no load are ignored or only use voltage, other signal measurements, and/or configuration information to determine their position in the hierarchy.
3. Multiple mains (Main1, Main2, Main3, etc.) may exist in the power system.
4. Data is provided to the monitoring system software by each monitoring device in the system.
5. Loads that start or stop affect the load profiles for any corresponding upstream metered data with a direct or indirect link to that load.
6. Voltage characteristics (fundamental, harmonic, symmetrical components) are relatively consistent for all monitoring devices on the same bus.
7. Transformer losses on the electrical system are minimal with respect to the loads downstream from the transformer.
8. General correlation (over time) of loads between monitoring devices indicates either a direct or indirect link.
9. Multiple unmetered loads at a point in the power system are aggregated into a single unknown load.

Any of the foregoing assumptions and parameters can be combined for a radial-fed electrical power system. For example, in a specific embodiment, any combination of the following rule-based assumptions and parameters may or may not be utilized:

1. Voltages and currents are higher the further upstream (closer to the top of the hierarchy) a monitoring device is, assuming no intervening upstream transformers or other energy conversion elements.
2. Harmonic values are generally lower the further upstream a monitoring device is.
3. Transformers can vary the voltages and currents.
4. Total power flow is higher upstream than downstream.
5. The power system may be a radial-fed system.
6. Two monitoring devices will not be installed at the same point, though this parameter is not necessarily a requirement in other aspects or embodiments.
7. Monitoring devices with the same voltage distortion are adjacently connected.
8. The total load measured at a specific hierarchical level is equal (excluding losses) to the sum of all measured and unmeasured loads directly linked to that hierarchical level.

Monitoring devices are considered to be on the same hierarchical level if they are all directly linked to the same reference device. For example, referring to FIG. 7, a simplified one-line diagram of a utility monitoring system 320 is shown having five distinct levels represented by 323*a,b,c,d,e*. In the specific case of a power monitoring system, each level represents a feeder to which multiple monitoring devices can be directly linked. All monitoring devices directly linked to a feeder are considered to be on the same feeder level. Thus, the main 322 is directly linked to the feeder 323*a*, and thus exists on its own level in the hierarchy. Feeder 323*b* directly links to three monitoring devices, and therefore comprises another distinct level. Feeder 323*c* comprises another level distinct from feeders 323*a* and 323*b* because the monitoring devices directly linked to feeder 323*c* are not directly linked to feeders 323*a* or 323*b*. In the case of water, air, gas, and steam systems, each level may be represented by a header instead of a feeder.

A specific aspect of the auto-learned hierarchy algorithm 400 is flow-charted in FIGS. 9-11A. The algorithm 400 first checks whether there is more than one monitoring device in the system (402), and if not, the algorithm ends. If more than one monitoring device is present, electrical data is taken from each monitoring device ($M_1, M_2, \ldots, M_k$) and compiled into a Data Table (404). The Data Table tabulates the raw data (such as power, voltage magnitude, voltage distortion, current magnitude, current distortion, or symmetrical component data) taken at regular intervals ($T_1, T_2, \ldots, T_n$) over a given time period. The time period between samples depends on the shortest duty cycle of any load in the power monitoring system. The maximum time period ($T_n$) is determined based on the level of variation of each monitoring device's load in the power monitoring system. The monitoring device with the maximum power in the Data Table is assumed to be a Main (i.e., highest level in the electrical hierarchy) (408). However, multiple hierarchies (i.e., multiple Mains) are also contemplated. An example of the Data Table is shown in Table 1 below.

TABLE 1

Data Table Example

| Time | Meter 1 | Meter 2 | Meter 3 | Meter 4 | ... | Meter k |
|------|---------|---------|---------|---------|-----|---------|
| T1   | D11     | D21     | D31     | D41     | ... | Dk1     |
| T2   | D12     | D22     | D32     | D42     | ... | Dk2     |
| T3   | D13     | D23     | D33     | D43     | ... | Dk3     |
| T4   | D14     | D24     | D34     | D44     | ... | Dk4     |
| .    | .       | .       | .       | .       |     | .       |
| .    | .       | .       | .       | .       |     | .       |
| .    | .       | .       | .       | .       |     | .       |
| Tn   | D1n     | D2n     | D3n     | D4n     | ... | Dkn     |

Once the data for the Data Table is accumulated, a Check Matrix is developed. The Check Matrix is a matrix of logical connections based on the Data Table. A zero (0) indicates that no direct link exists between any two monitoring devices, and a one (1) indicates that there is a possible relationship between two monitoring devices. An exemplary Check Matrix is illustrated in Table 2 below. In Table 2, it is assumed that no link exists between Meter 1 and Meter 2. This is because the power measured by Meter 1 exceeds Meter 2 in one entry of the Data Table and the power measured by Meter 2 exceeds Meter 1 in another entry of the Data Table. Meter 1 always correlates with itself so an NA is placed in that cell of the Check Matrix. Only half of the Check Matrix is required due to the redundancy of information.

TABLE 2

Check Matrix Example

| | Meter 1 | Meter 2 | Meter 3 | Meter 4 | ... | Meter k |
|---|---|---|---|---|---|---|
| Meter 1 | NA | 0 | 1 | 1 | ... | 0 |
| Meter 2 | 0 | NA | 1 | 0 | ... | 1 |
| Meter 3 | 1 | 1 | NA | 0 | ... | 1 |
| Meter 4 | 1 | 0 | 0 | NA | ... | 0 |
| . | . | . | . | . | ... | . |
| . | . | . | . | . | | . |
| . | . | . | . | . | | . |
| Meter k | 0 | 1 | 0 | ... | NA | |

Once the Check Matrix is determined, the data from each monitoring device in the Data Table is used to develop a Correlation Coefficient Matrix (CCM) shown in Table 3 below. In the CCM, a statistical evaluation is carried out to determine the linear relationship of each monitoring device in the electrical system with respect to the other monitoring devices in the matrix. The correlation coefficient between any two monitoring devices is determined and placed in the appropriate cell in the CCM. In the exemplary Table 3 below, $C_{12}$ is the correlation coefficient of Meter 1 with respect to Meter 2. The higher the correlation coefficient value is, the higher the probability that these two monitoring devices are either directly or indirectly linked. Conversely, the lower this number is, the lower the probability that these two monitoring devices are directly or indirectly linked. Equation 2 below is used to determine the correlation coefficient between any two given monitoring devices:

$$\rho_{x,y} = \frac{\text{Cov}(x, y)}{\sigma_x \sigma_y} \quad \text{(Equation 2)}$$

where: $\rho_{x,y}$ is the correlation coefficient and lies in the range of $-1 \leq \rho_{x,y} \leq 1$; Cov(x,y) is the covariance of x and y; and $\sigma_x$ and $\sigma_y$ are the standard deviations of x and y, respectively.

$$\text{Cov}(x, y) = \frac{1}{n} \sum_{j=1}^{n} (x_j - \mu_y)(y_j - \mu_y) \quad \text{(Equation 3)}$$

where: n is the number of data elements in x and y, and, $\mu_x$ and $\mu_y$ are the mean values of x and y respectively.

The diagonal cells of the Correlation Matrix are all always 1 because each meter has 100% correlation with itself. Again, only half of the Correlation Matrix is required due to the redundancy of data (e.g., $C_{12} = C_{21}$).

TABLE 3

Correlation Coefficient Matrix (CCM) Example

| | Meter 1 | Meter 2 | Meter 3 | Meter 4 | ... | Meter k |
|---|---|---|---|---|---|---|
| Meter 1 | 1 | $C_{12}$ | $C_{13}$ | $C_{14}$ | ... | $C_{1k}$ |
| Meter 2 | $C_{21}$ | 1 | $C_{23}$ | $C_{24}$ | ... | $C_{2k}$ |
| Meter 3 | $C_{31}$ | $C_{32}$ | 1 | $C_{34}$ | ... | $C_{3k}$ |
| Meter 4 | $C_{41}$ | $C_{42}$ | $C_{43}$ | 1 | ... | $C_{4k}$ |
| . | . | . | . | . | 1 | . |
| . | . | . | . | . | | . |
| . | . | . | . | . | | . |
| Meter k | $C_{k1}$ | $C_{k2}$ | $C_{k3}$ | $C_{k4}$ | ... | 1 |

Returning to FIG. 9, a list of meters is developed for each level of the hierarchy under consideration. The top-most level is assumed to be the meter with the largest power reading, which is assumed to be a main. Once that meter is found in the Data Table (408), the algorithm 400 places the main in a feeder level list of the hierarchy and clears the list of monitoring devices on the current feeder level in the hierarchy (410). In subsequent iterations through the MAIN LOOP, the algorithm 400 places the reference meter in the previous feeder level list of the hierarchy. It should be understood that on the first iteration, there is no previous level list. The algorithm 400 clears a Correlation Reference Array (CRA) (412), and designates the main as the reference monitoring device (414). An exemplary CRA is shown in Table 4, below, for n iterations for a given feeder level. $C_{51}$ corresponds to the correlation coefficient between meter 5 (the reference meter) and meter 1, $C_{52}$ corresponds to the correlation coefficient between meter 5 and meter 2, and so forth. Initially, the CRA is cleared for each feeder level, and the algorithm 400 develops a new CRA for each feeder level by populating each iteration column with correlation coefficients for all meters on the current feeder level. A specific example is explained in connection with Table 5 below.

The Correlation Coefficient Matrix (CCM) is calculated based on the power data (416). In the first iteration, the only known element in the hierarchy is the main, and the hierarchy is auto-learned from the top-most feeder level down, in accordance with some or all of the assumptions or parameters listed above.

TABLE 4

Correlation Reference Array (CRA) Example

| Iteration 1 | Iteration 2 | Iteration 3 | Iteration 4 | Iteration 5 | ... | Iteration n |
|---|---|---|---|---|---|---|
| $C_{51}$ | $C_{51}$ | $C_{51}$ | $C_{51}$ | $C_{51}$ | ... | $C_{51}$ |
| $C_{52}$ | $C_{52}$ | $C_{52}$ | $C_{52}$ | $C_{52}$ | ... | $C_{52}$ |
| $C_{53}$ | $C_{53}$ | $C_{53}$ | $C_{53}$ | $C_{53}$ | ... | $C_{53}$ |
| $C_{54}$ | $C_{54}$ | $C_{54}$ | $C_{54}$ | $C_{54}$ | ... | $C_{54}$ |
| ... | ... | ... | ... | ... | ... | ... |
| $C_{5m}$ | $C_{5m}$ | $C_{5m}$ | $C_{5m}$ | $C_{5m}$ | ... | $C_{5m}$ | in Iteration 2 to 0.436 in Iteration 3 to 0.525 in Iteration 4 and finally to 0.671 in Iteration 5, which is the highest correlation coefficient among all the meters (meter 5 correlated with itself is always 1.0, so its correlation coefficient is ignored). This increasing trend also provides a high degree of confidence that meter 18 is also directly linked with meter 5, and this link is finally confirmed in Iteration 5. The same increasing trends can be observed for meters 12 and 15, for example. In Iteration 7, none of the correlation coefficients exceed a threshold, and the algorithm 400 proceeds to analyze the next feeder level. By Iteration 7, the algorithm 400 has determined that meters 11, 12, 14, 15, 18, and 20 are directly linked with meter 5.

TABLE 5

CRA Example With Exemplary Correlation Coefficients

| | Iteration 1 | Iteration 2 | Iteration 3 | Iteration 4 | Iteration 5 | Iteration 6 | Iteration 7 |
|---|---|---|---|---|---|---|---|
| 5-1 | 0.020 | −0.029 | 0.010 | 0.016 | −0.037 | −0.004 | 0.007 |
| 5-2 | 0.043 | −0.020 | −0.037 | −0.009 | −0.095 | −0.091 | −0.099 |
| 5-3 | 0.067 | 0.079 | 0.017 | 0.024 | −0.052 | −0.046 | −0.009 |
| 5-4 | 0.018 | −0.024 | −0.038 | −0.018 | 0.037 | 0.015 | 0.037 |
| 5-5 | 1.000 | 1.000 | 1.000 | 1.000 | 1.000 | 1.000 | 1.000 |
| 5-6 | 0.058 | 0.022 | −0.016 | −0.015 | −0.035 | −0.010 | 0.029 |
| 5-7 | −0.042 | −0.005 | 0.001 | 0.054 | 0.033 | 0.026 | 0.031 |
| 5-8 | −0.034 | −0.016 | −0.057 | −0.058 | 0.005 | −0.034 | −0.049 |
| 5-9 | 0.418 | 0.386 | 0.308 | 0.292 | 0.189 | 0.099 | 0.136 |
| 5-10 | 0.022 | 0.077 | 0.016 | 0.014 | −0.016 | −0.018 | 0.022 |
| 5-11 | 0.649 | −0.048 | −0.090 | −0.095 | −0.076 | −0.077 | −0.014 |
| 5-12 | 0.344 | 0.506 | 0.628 | 0.725 | 0.047 | −0.007 | 0.016 |
| 5-13 | −0.038 | −0.036 | 0.038 | 0.017 | −0.046 | −0.023 | −0.010 |
| 5-14 | 0.483 | 0.591 | 0.072 | 0.044 | 0.066 | −0.006 | 0.004 |
| 5-15 | 0.043 | 0.161 | 0.210 | 0.263 | 0.417 | 0.587 | 0.031 |
| 5-16 | 0.024 | 0.045 | 0.055 | 0.044 | −0.017 | −0.010 | 0.022 |
| 5-17 | −0.057 | −0.063 | −0.101 | −0.090 | −0.061 | −0.048 | −0.049 |
| 5-18 | 0.296 | 0.417 | 0.436 | 0.525 | 0.671 | 0.113 | 0.165 |
| 5-19 | −0.046 | −0.053 | −0.057 | −0.047 | −0.046 | −0.050 | −0.034 |
| 5-20 | 0.398 | 0.549 | 0.633 | 0.128 | 0.069 | 0.054 | 0.061 |
| 5-21 | −0.060 | −0.017 | 0.028 | 0.080 | −0.013 | 0.010 | 0.005 |

Figure 10:
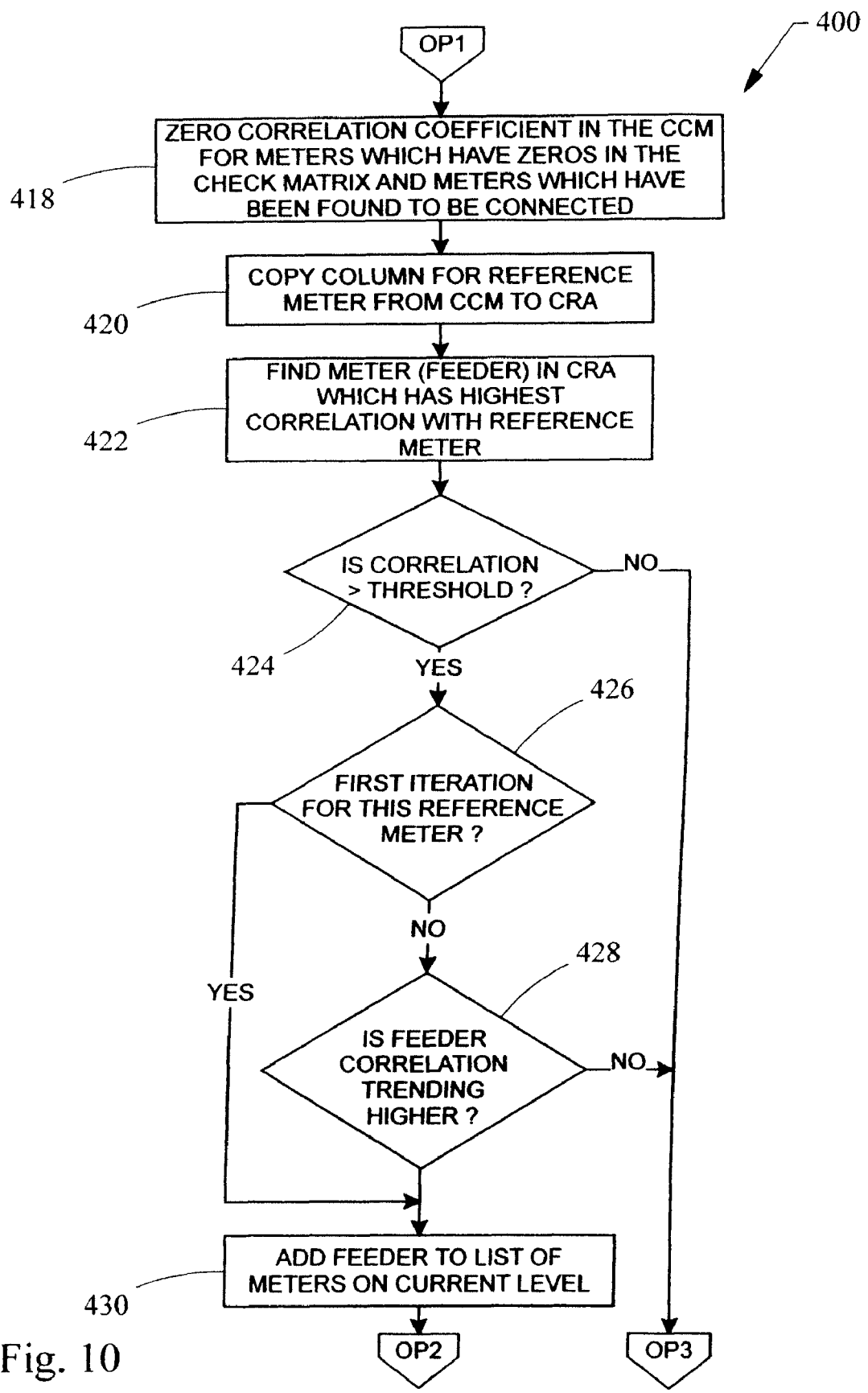

Continuing with FIG. 10, the algorithm 400 zeros the correlation coefficients in the CCM for meters that have zeros in the Check Matrix and meters that have already been found to be connected (418). The column for the reference monitoring device is copied from the CCM to the CRA (420). A specific example will be explained next in connection with Table 5 below. Assume that meter 5 in the CCM is designated as the reference meter (414). The algorithm 400 calculates the CCM based on the Data Table (416) and zeroes the correlation coefficient(s) in the CCM for meters that have zero in the Check Matrix and meters that have been found to be connected (418). The column in the CCM corresponding to meter 5 is copied into the column Iteration 1 of the CRA. Referring to Table 5, meter 11 has the highest correlation with meter 5 of 0.649, and meter 11 is marked as connected with meter 5 for the current feeder level.

In Iteration 2, meter 11's power is subtracted from meter 5's power in the data table, and the meter 5-11 correlation coefficient drops to −0.048 in Iteration 2, which provides a high degree of confidence that meter 11 is interrelated with meter 5. Also noteworthy is that some meter's correlation coefficients trend higher as the iterations progress. For example, the correlation coefficients for meter 18 relative to meter 5 gradually increase from 0.296 in Iteration 1 to 0.417

Still referring to FIG. 10, the algorithm 400 finds the monitoring device (feeder) in the CRA that has the highest correlation with the reference monitoring device (422). If the correlation does not exceed a threshold (0.5 in a preferred embodiment), the algorithm 400 continues to FIG. 11A (OP3), such as in the case of Iteration 7 in Table 5 shown above.

Otherwise, the algorithm 400 determines whether the current iteration is the first iteration for the reference monitoring device (426), and if not, determines whether the feeder correlation is trending higher (428). If the feeder correlation is not trending higher, the algorithm 400 continues to FIG. 11A (OP3). A higher trend is an indication that the monitoring device is likely on the current level of the hierarchy under consideration.

Figure 11A:
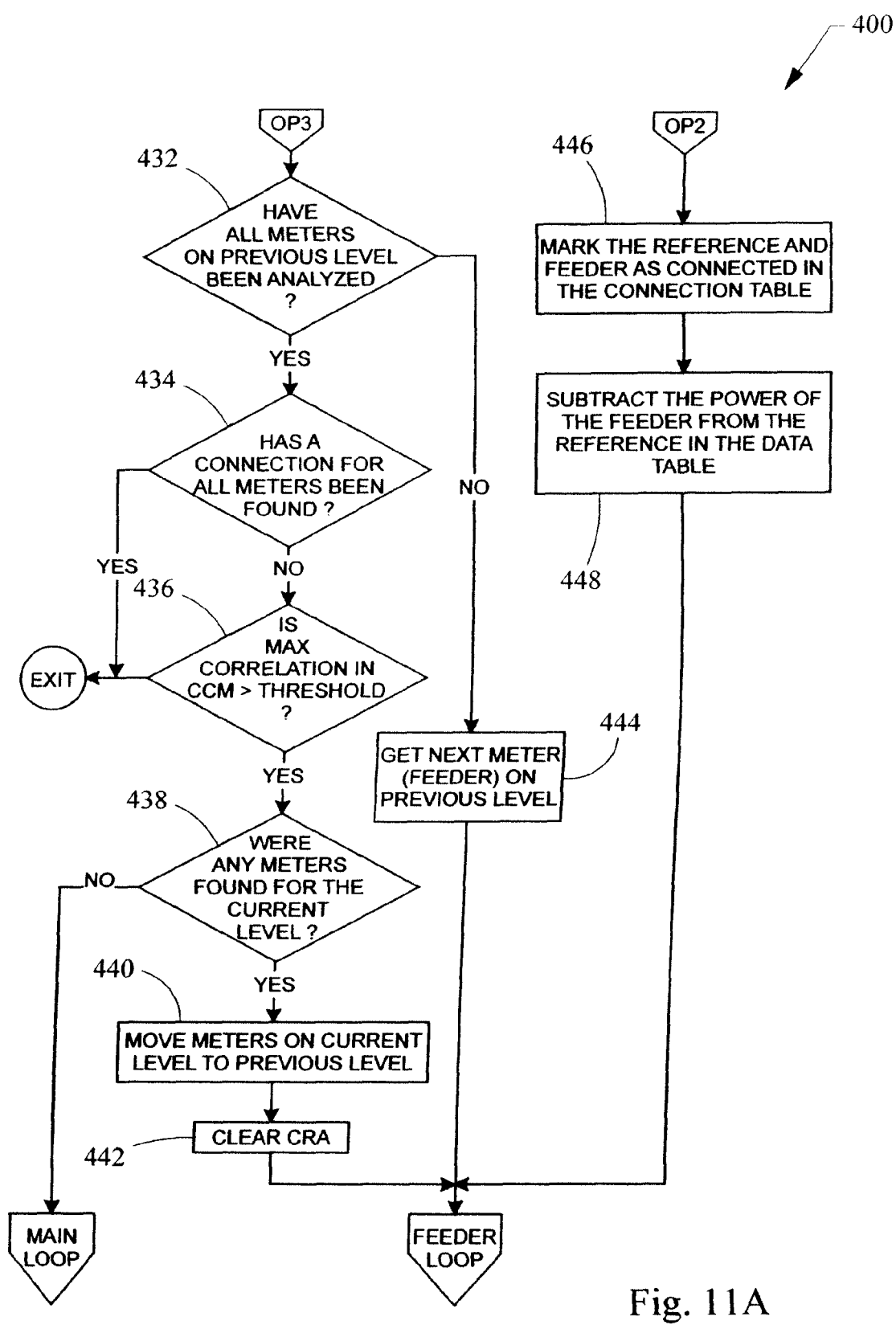

If the current iteration is the first iteration for the reference monitoring device, the feeder is added to the list of monitoring devices on the current level of the hierarchy (430), and the algorithm 400 continues to FIG. 11A (OP2). The reference monitoring device and the feeder are designated as directly linked (or interrelated) in a connection table (446), and the power associated with the feeder is subtracted from the reference monitoring device in the data table (448). The connection table maintains a list of devices and their interrelationships (for example, whether they are directly linked). By subtracting the power of the feeder associated with the highest correlation coefficient relative to the reference monitoring device, other feeders (monitoring devices) connected to the reference monitoring device will see their correlation coefficients increase. The algorithm 400 returns to the FEEDER LOOP of FIG. 9, and the next iteration continues with the remaining monitoring devices.

Figure 9:
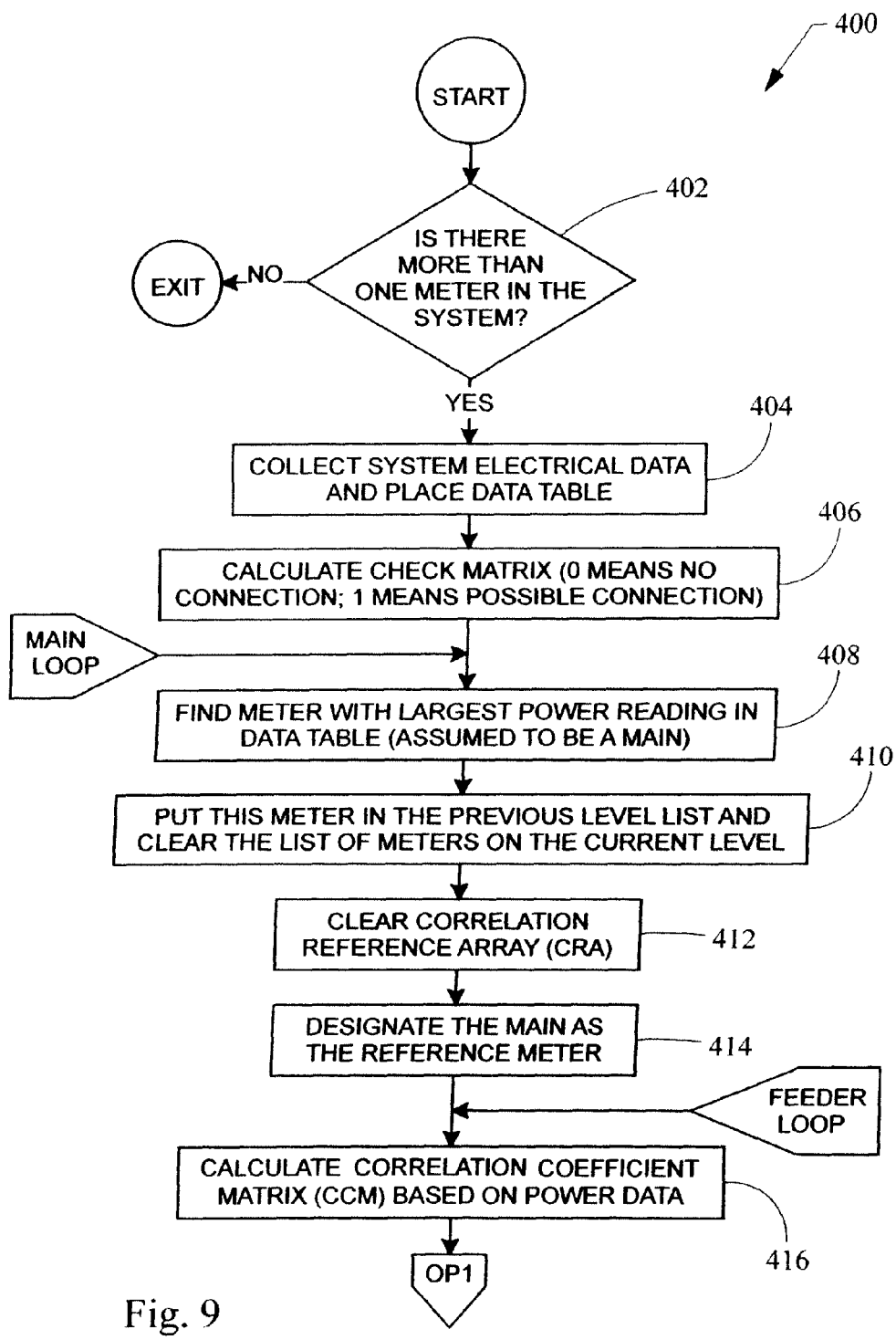

Turning now to the OP3 function, the algorithm 400 determines whether all monitoring devices on the previous level have been analyzed (432), and if not, the next monitoring device (feeder) is obtained on the previous level, and the algorithm 400 returns to the FEEDER LOOP of FIG. 9. If all monitoring devices on the previous level have been analyzed, the algorithm 400 checks whether a connection has been found for all monitoring devices in the hierarchy (434). If so, the algorithm 400 exits. If not, the algorithm 400 checks whether the highest correlation coefficient in the CCM exceeds a threshold (436). If not, the algorithm 400 exits. If so, the algorithm 400 determines whether any more monitoring devices are found for the current level (438). If not, the algorithm 400 returns to the MAIN LOOP in FIG. 9. If so, the algorithm moves the monitoring devices on the current level to the previous level (440) and clears the CRA (442). The algorithm returns to the FEEDER LOOP of FIG. 9 to determine the relationships among the remaining monitoring devices on the current level.

Figure 11B:
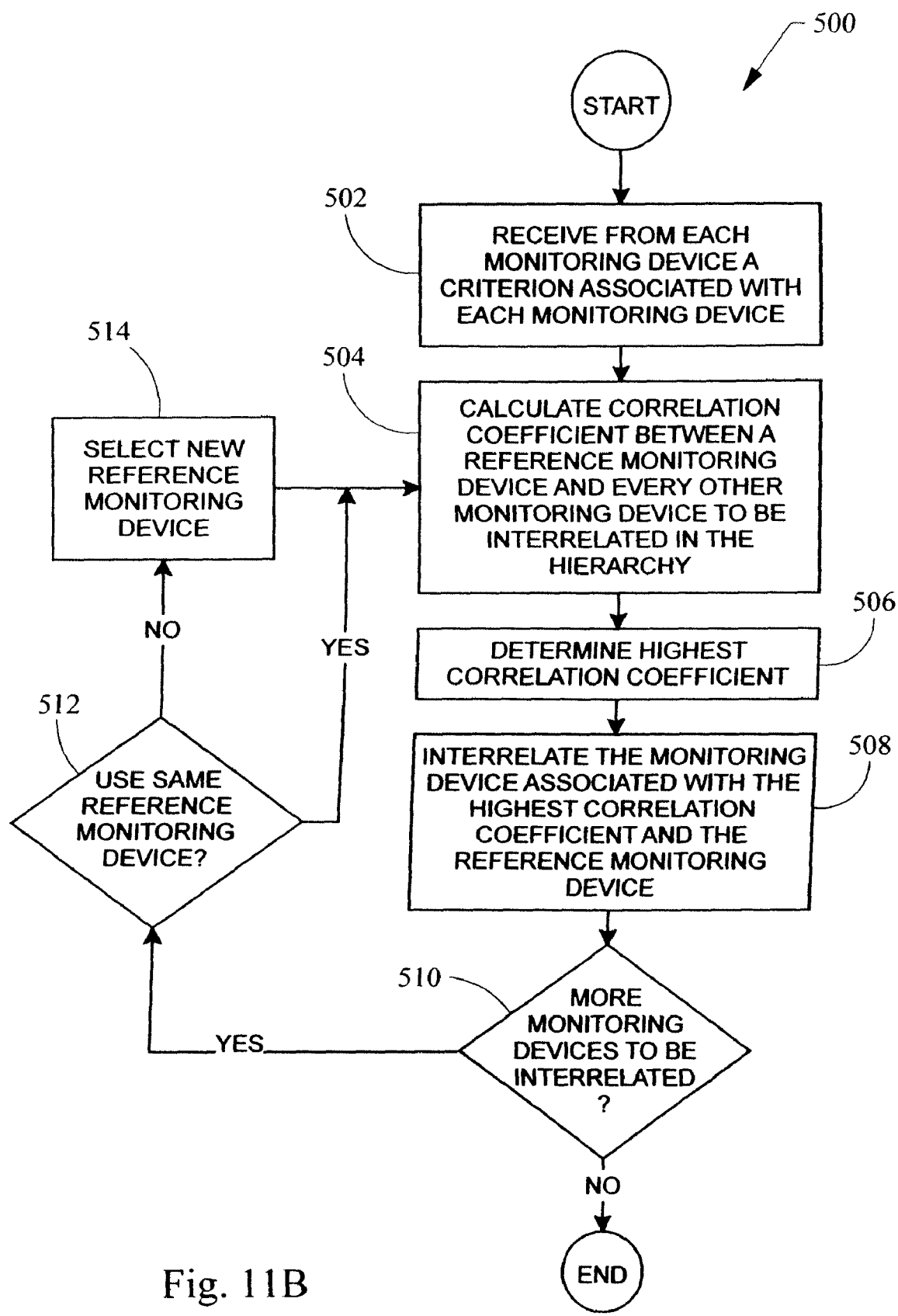
FIG. 11B is a flow chart diagram of an auto-learned hierarchy algorithm.

A modified auto-learned hierarchy algorithm 500 is illustrated in FIG. 11B. The algorithm 500 starts by receiving from each power monitoring device a criterion associated with each monitoring device (502). The criterion can be power, voltage, current, current distortion, voltage distortion, or energy. The criterion can also be a parameter associated with any WAGES utility, such as volumetric flow rates, mass flow rates, volumetric flux and mass flux. For example, when the criterion is a voltage distortion, monitoring devices on the same level of the hierarchy will have roughly the same voltage distortion. Additionally or alternatively, the algorithm can use the harmonic distortion values to verify the hierarchy determined by the correlations based on power criteria. Harmonic distortion can also be used by the algorithm to better predict unknown candidates with greater accuracy. For example, a monitoring device may be marginally correlated with a reference device such that the algorithm cannot determine whether a direct link exists or not. Harmonic distortion can rule in or rule out a potential interrelationship depending upon the harmonic distortion values of the neighboring devices on the same level as the monitoring device in question. For example, a different harmonic distortion returned for the monitoring device in question could rule it out as being directly linked with a device on the previous level.

The algorithm 500 calculates a correlation coefficient between a reference monitoring device and every other monitoring device to be interrelated in the hierarchy (504). The algorithm 500 determines the highest correlation coefficient (506) and interrelates the monitoring device associated with the highest correlation coefficient and the reference monitoring device (508). The algorithm 500 checks whether more monitoring devices are to be interrelated (510), and if not, the algorithm 500 ends. If so, the algorithm 500 checks whether to use the same reference monitoring device (512), and if so, recalculates the correlation coefficients (504). Otherwise, the algorithm 500 selects a new reference monitoring device (514), and recalculates the correlation coefficients (504).

Figure 11C:
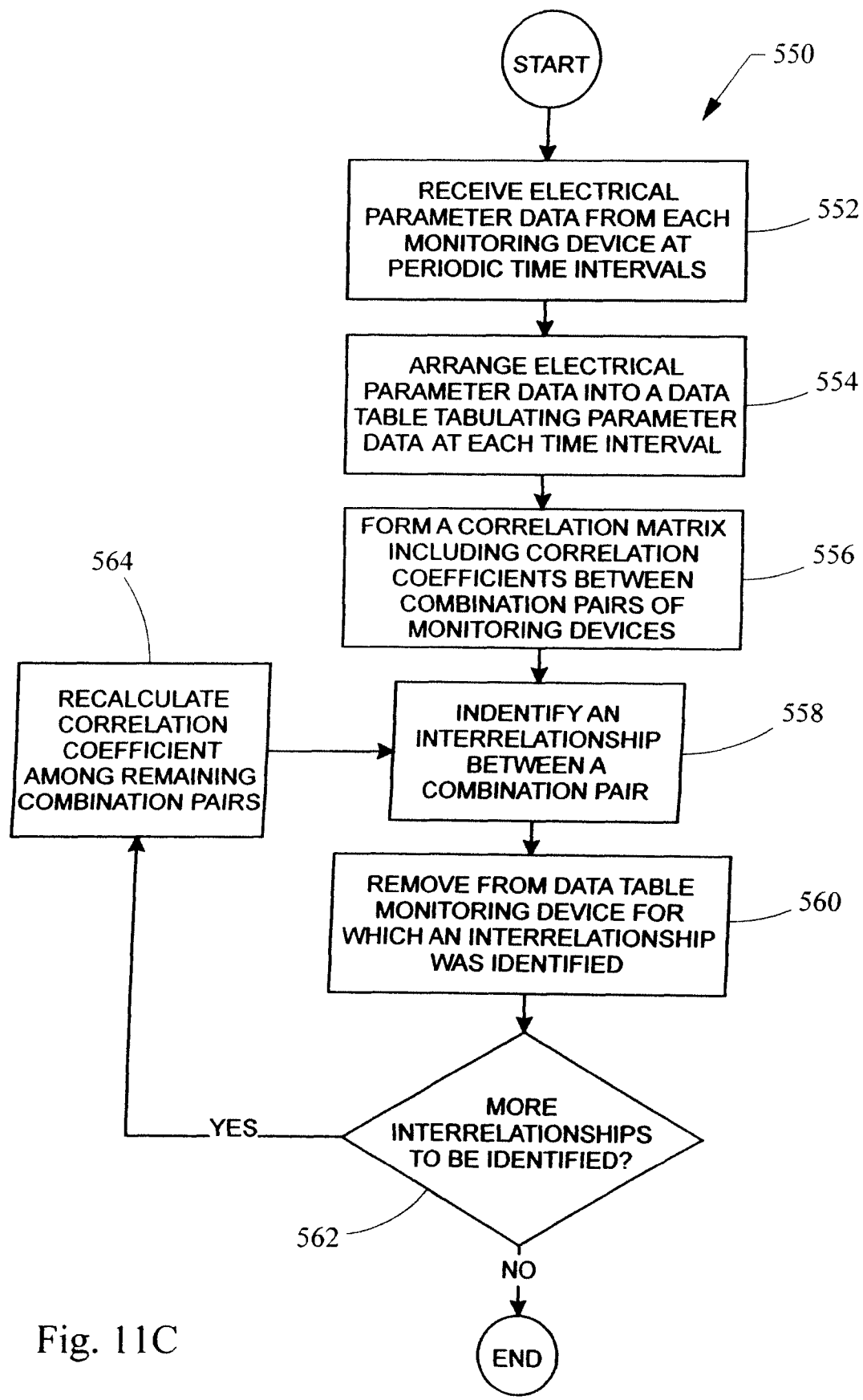
FIG. 11C is a flow chart diagram of a modified auto-learned hierarchy algorithm.

Another auto-learned hierarchy algorithm 550 is illustrated in FIG. 11C. The algorithm 550 starts by receiving electrical parameter data from each monitoring device at periodic time intervals (552). The algorithm 550 arranges the electrical parameter data into a data table that tabulates the parameter data at each time interval (554). A correlation matrix is formed that includes correlation coefficients between combination pairs of monitoring devices (556). The algorithm 550 identifies an interrelationship between a combination pair (558) and removes from the data table the power associated with the monitoring device for which an interrelationship was identified (560). If no more interrelationships are to be identified (562), the algorithm 550 ends. Otherwise, it recalculates correlation coefficients among the remaining combination pairs (564) and identifies another interrelationship between the remaining combination pairs (558). This process is repeated until all interrelationships among the monitoring devices have been identified.

The auto-learned hierarchy algorithms are operable in both radial-fed and multiple radial-fed systems. In multiple radial-fed systems, the algorithm first determines the main meter having the highest power, then determines the hierarchy for that system first before proceeding to the next system(s) having lower power ratings. The auto-learned hierarchy may also be useful in non-radial fed systems.

The auto-learned hierarchy algorithm has been discussed in various embodiments in which the hierarchy is developed from the top-most level towards the bottom-most level. In an alternate embodiment, an auto-learned hierarchy algorithm develops a hierarchy from the bottom-most level based on events local to each level. For example, monitoring devices proximate to an event will 'see' an event, such as a load turning on or off, before monitoring devices remote from the event will see it. The algorithm recognizes interrelationships among monitoring devices based on the occurrences of events and the timestamps associated with each monitoring device as to when it became aware of an event. By mapping out a chronology of when each monitoring device in the system perceives an event, conclusions can be automatically drawn based upon the time order in which monitoring device perceived that event as to which meters are interrelated (directly linked).

Referring back to FIG. 1, the automated data integrated monitoring system 100 produces contextual data 108 from the data alignment system 104 and the hierarchy classification system 106. The contextual data 108 contains the data from each monitoring device in context with every other monitoring device and is thus more valuable to the user. Contextual analysis of the measured data can be performed, which involves an assessment of the data such that specific external parameters from each monitoring device are aligned or are made known. The primary external parameters of concern include:

The temporal position of each monitoring device's data in the utility system 102 relative to every other monitoring device's data in the utility system 102; and The spatial position of each monitoring device M in the utility system 102 with respect to every other monitoring device M in the utility system 102.

Evaluating all the monitoring data accumulated from the utility system 102 in context will provide a degree of knowledge about the utility system 102 that heretofore was unavailable. Because the information from the entire system (software and monitoring devices) is integrated together through a uniform context, this approach to monitoring a utility system is referred to as Integrated Monitoring (IM).

A useful analogy of the IM approach is the central nervous system of the human body. The brain (software) knows what is going on with the entire body (the monitoring devices) relative to time and position. If a toe is stubbed, the brain sends a signal for the body to react in some manner. Similarly if an electrical event occurs, the IM algorithms executed by the monitoring system software provides useful information to the user on the symptoms throughout the monitored system, potential sources of the problem, and possible solutions or recommendations.

Integrating data based on analysis of the data from each monitoring point uses special algorithms (for example, a data alignment algorithm and an auto-learned hierarchy algorithm) in the monitoring system software. In the data alignment system 104, subtle but measurable changes in the data's frequency and amplitude are analyzed from all data sources. These changes are used to establish both the common point of data alignment for all data sources and a data source's position in the electrical system with respect to other data sources. Because the process of integrating the system data is performed automatically on algorithms in the monitoring system software, much of the effort and expense required by the user is eliminated. More arbitrary and substantial variations of the parameters being analyzed offers quicker integration of the system data.

There are several benefits associated with IM that are beyond what is presently available including:

The automated IM approach greatly reduces the existing requirements for the user to manually provide detailed information about the power system layout in order to put the system data into context. The IM algorithms analyze data from each monitoring point in the electrical system to automatically determine the system layout with little or no user involvement, saving the user time and resources.

The automated IM approach eliminates the need for special hardware, additional data lines, and, in some cases, monitor accessories. The IM algorithms analyze data from each monitoring point in the electrical system to automatically determine the temporal alignment of the system data, saving the user equipment and labor costs.

The automated IM approach allows an easier configuration of monitoring hardware and software. This is because the IM algorithms automatically put the monitoring information into context throughout the system. Once the monitoring devices are in context, additional decisions regarding hardware and software configuration can automatically be made by the IM algorithms. One example would be setting a monitoring device's under-voltage threshold depending on the monitoring device's location within the electrical system. Again, the automated IM approach saves the user time and resources.

Figure 12:
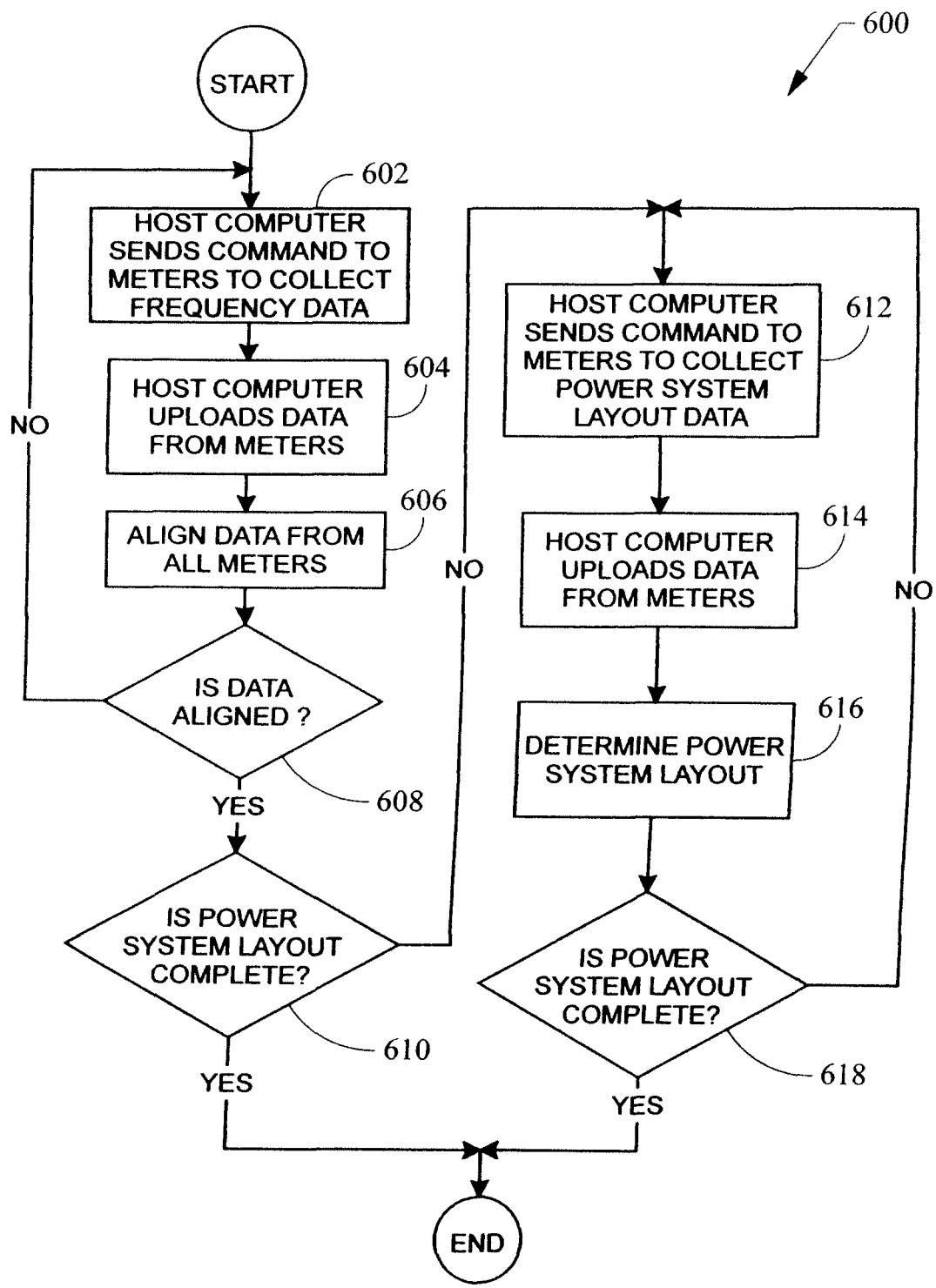
FIG. 12 is a flow chart diagram of an automated integrated monitoring algorithm.

An automated IM algorithm 600 is illustrated in FIG. 12. The algorithm 600 starts by sending a command to the monitoring devices to collect frequency data (602). Data from the monitoring devices is uploaded to the host computer (604) and the data from all the monitoring devices is aligned (606). When all the data is aligned, the algorithm 600 determines whether the power system layout is complete (610). If so, the algorithm 600 ends, and the contextual data can be used in further software applications.

If the power system layout is not complete, the algorithm 600 sends a command to the monitoring devices to collect power data (612). The host computer running the algorithm 600 uploads the power data from monitoring devices (614) and determines the power system layout (616) in accordance with the present invention. This procedure is repeated until the power system layout is complete (618) at which point the algorithm ends.

There are many considerations to be accounted for when dealing with the nuances of practical power monitoring systems. These considerations are multiplied when sophisticated algorithms are employed to perform complex analyses and provide firm conclusions to the end user.

Basic factors such as the accuracy, number, location, type, and monitored load of discrete devices can significantly influence the results of expert-based systems and their subsequent conclusions. Because of these (and other) unknowns and the inability to predict their occurrence, it is desirable to employ an algorithm that can successfully operate despite coping with the dynamic attributes of an atypical power monitoring system.

Complex power monitoring systems can include multiple devices at a single point, device inaccuracies, erroneous configurations and/or various device capabilities. For these complex systems, it is desirable to use enhanced algorithms that provide one or more of the following improvements:

Increasing efficiency by segmenting extensive systems into more manageable sections for processing.

Locating and reconciling redundant devices installed at a single point in the power monitoring system.

Managing the inherent accuracy dynamics that occur in all real-world devices.

Reducing error through continuous re-evaluations.

Determining the placement and characteristics of various power system apparatuses (e.g., transformers, etc.).

Adjusting the algorithm's intersample interval using changes in operational parameters.

Minimizing the total samples required using "sample and assess" techniques.

Establishing small virtual loads versus losses/inaccuracies.

Identifying and suggesting placement of orphan devices for users.

Indicating potential configuration issues.

These enhancements provide benefits such as fast and robust algorithms and accurate results for complex power monitoring systems. They also provide solutions to issues related to virtual loads and orphan devices and configuration issues that could affect the algorithm.

Figure 13:
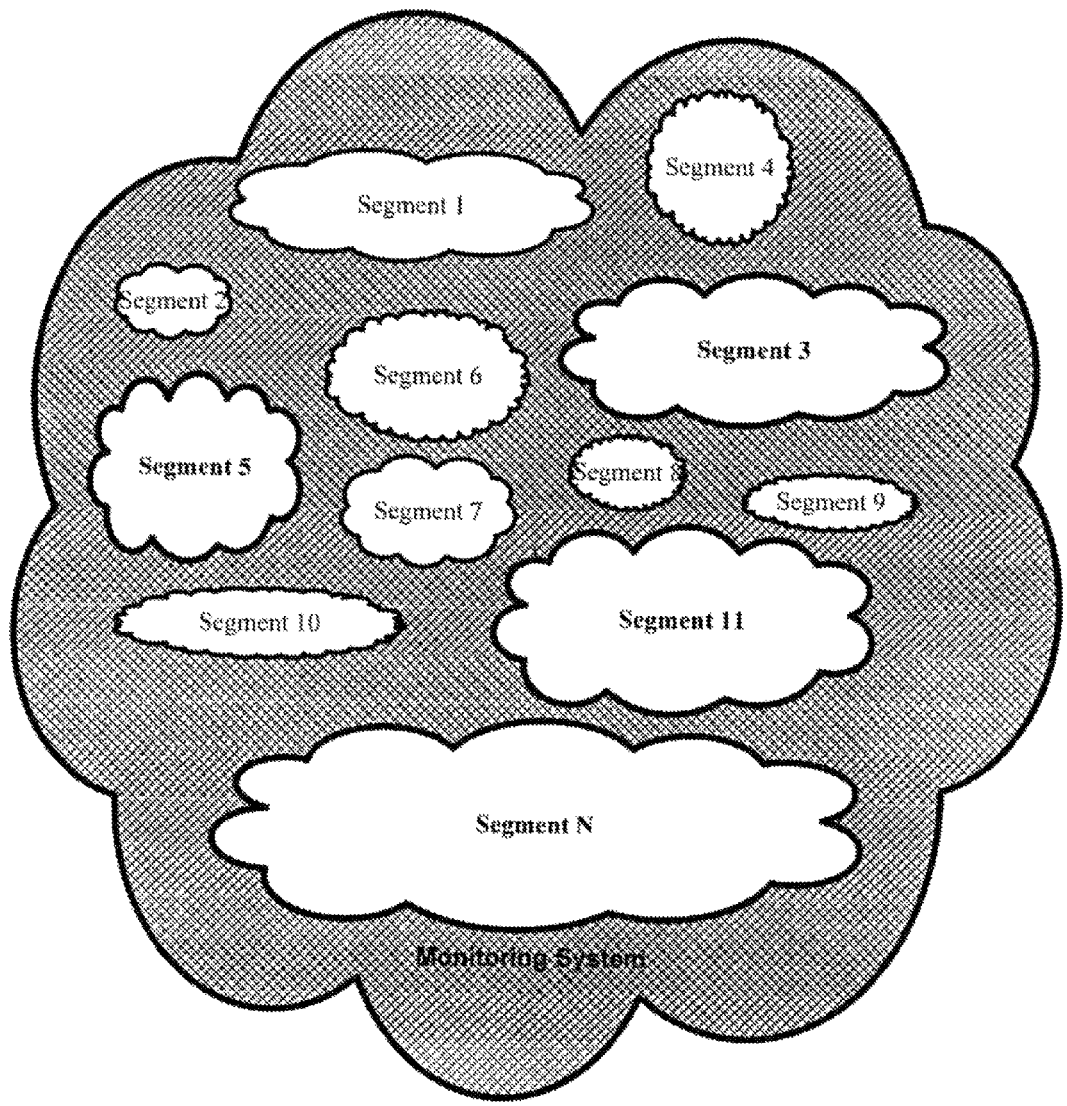
FIG. 13 is a diagrammatic illustration of an exemplary segmentation of a power monitoring system.

Because of the hierarchy algorithm's inherent requirement for synchronous sampling of data from all devices, extensive (both in the number of devices and in their broad distribution) power monitoring systems may be difficult to spatially align. One solution to the difficulty of aligning extensive monitoring systems is to first segment the system into smaller and more manageable pieces (as depicted in FIG. 13), determine the hierarchy of each individual segment, and then compile the segment hierarchies into the final spatial hierarchy of the entire monitoring system. While arbitrary grouping of devices into segments can be done, there is a high probability that the devices will still not be capable of spatial alignment, because arbitrary choosing of devices for a given segment may allow unrelated devices and/or devices that are remote from each other to be in the same segment. These conditions may result in both insurmountable complications in determining device relationships and in communications latencies that adversely affect the ability to obtain synchronous data samples. Logical segmentation of the devices is helpful to overcome the issues of an extensive monitoring system.

The devices in an extensive monitoring system can be appropriately segmented by reviewing both internal (configuration) and external (device readings) parameters from the devices and/or information from the software. Table 1 shows a few examples of internal parameters and how they can be used to indicate a more useful segmentation of the monitoring devices:

TABLE 1

Some Internal Parameters Used for Device Segmentation

| Internal Parameters | Possible Indication |
| --- | --- |
| Active demand synchronization pulse | Device(s) installed at or near main |
| Communications (including IP address, device address, baud rate, parity, bit size, protocol, etc.) | Devices located within the same geographic area due to distance limitations of subnet devices |
| Meter Type | More sophisticated devices located at a higher level in the monitoring system hierarchy |
| System Type | Device(s) installed in near proximity |
| Scaling Factors (including VT/CT ratios, multipliers, auto ranging, etc.) | Device(s) installed in near proximity |
| System Frequency | Devices installed within the same geographic location |

Table 2 shows a few general examples of external parameters and how they could be used to indicate a more useful segmentation of the monitoring devices:

TABLE 2

Some External Parameters Used for Device Segmentation

| External Parameter | Possible Indication |
| --- | --- |
| Power | Layout of monitoring system |
| Voltage (including phase voltage, average voltage, voltage unbalance, etc.) | Device(s) located on the same bus, the location of transformers and their step-up/step-down ratios, phase nomenclatures |
| Waveform Distortion (including THD, thd, discrete component magnitudes and discrete component angles, etc.) | Device(s) located on the same bus, phase nomenclatures |
| Sequential Components (positive, negative and zero) | Device(s) located on the same bus, transformer information |
| Flicker Levels (voltage) | Device(s) located on the same bus |
| Temperature (internal ambient from devices) | Device(s) located in the same switchgear |

Figure 14:
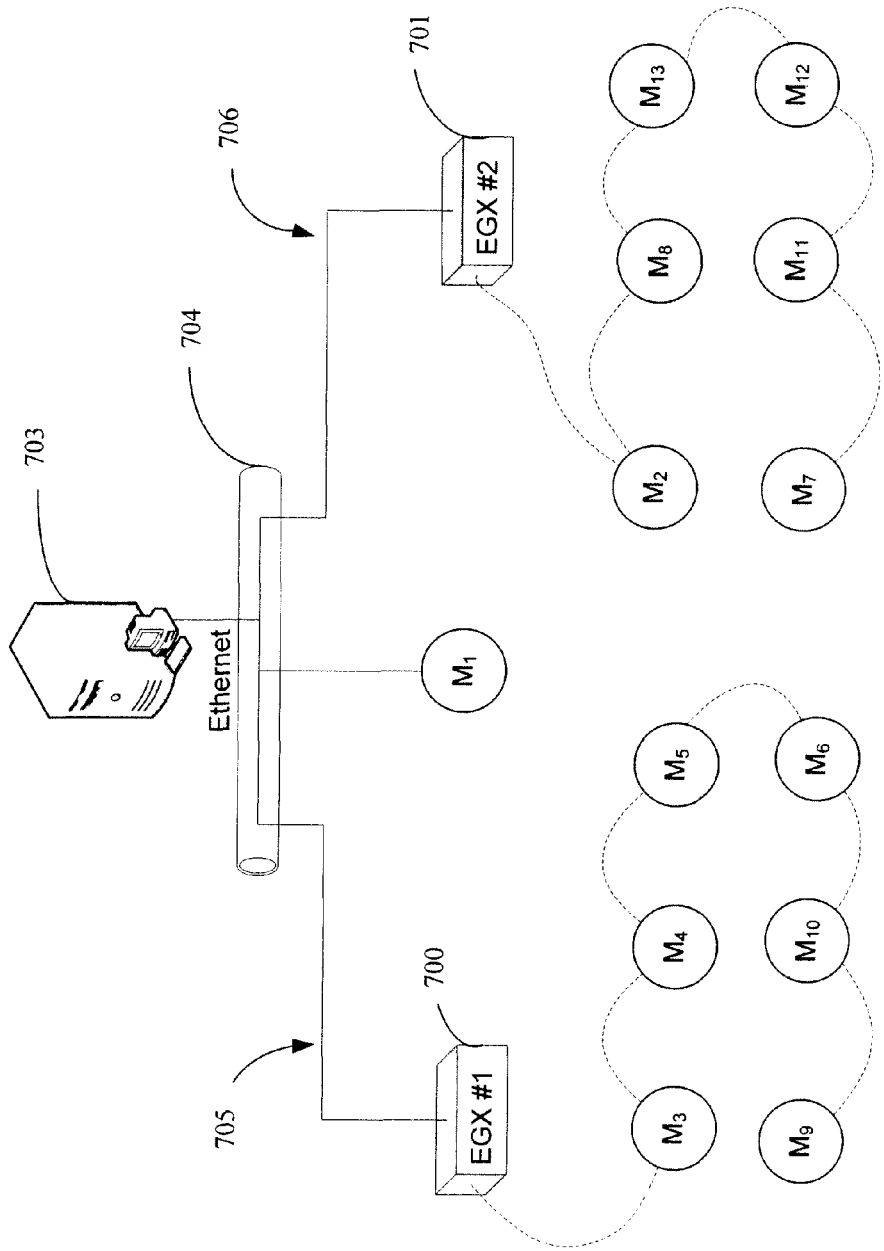
FIG. 14 is a diagrammatic illustration of a power monitoring system including an Ethernet, a pair of Ethernet gateways, and multiple power monitoring devices.

As a simple example of how segmenting works, FIG. 14 illustrates a simple monitoring system with thirteen monitoring devices $M_1$-$M_{13}$, two Ethernet gateways ("EGX's") 700 and 701 and a server 703, which use an Ethernet 704 and two RS-485 subnets 705 and 706. There is no known monitoring system hierarchy at this point in the process.

Reviewing the internal parameters reveals that there are only three IP addresses for the entire system—one for device $M_1$ connected directly to the Ethernet 704, one for EGX 700 and one for EGX 701. There are six devices ($M_3$,$M_4$,$M_5$,$M_6$,$M_9$,$M_{10}$) using one IP address at EGX 700, and another six devices ($M_2$,$M_7$,$M_8$,$M_{11}$,$M_{12}$,$M_{13}$) using a second IP address at EGX 701. Reviewing the external parameters (voltages in this case) reveals additional information about the hierarchy of the monitoring system.

Figure 15:
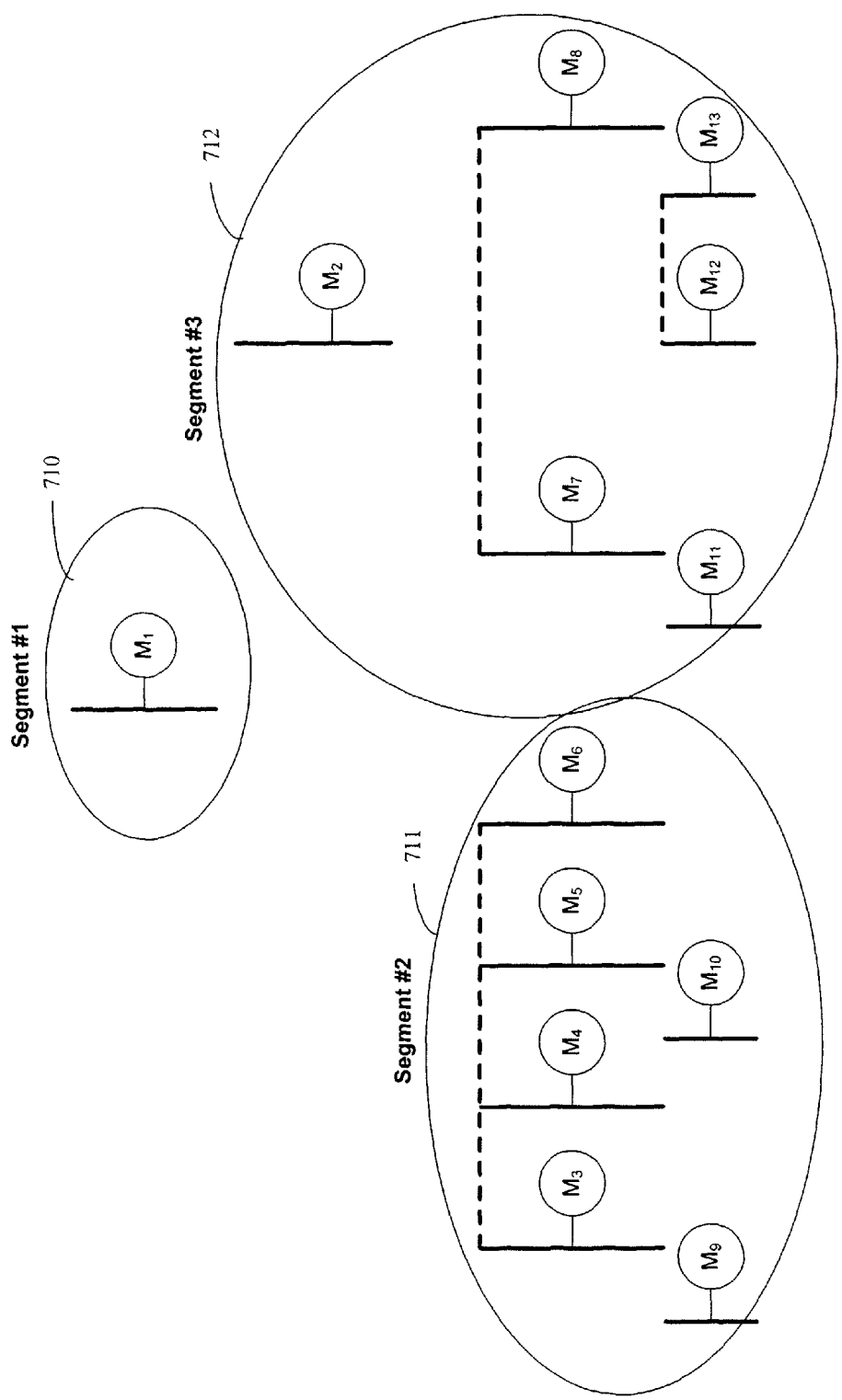
FIG. 15 is a diagrammatic illustration of a logical segmentation of the devices included in the system of FIG. 14 and including potential relationships of certain of the devices based on voltages measured by the devices.

As depicted in FIG. 15, it is possible to develop three logical segments 710, 711 and 712 using information derived from the internal and external parameters. Each of the three segments 710-712 in FIG. 15 is based on the communications configurations. Within these segments, potential relationships are determined based on measured voltages (e.g., phase, discrete harmonic components, average, THD, thd, etc.) at each device. Broken lines in FIG. 15 connect devices potentially located on the same bus. It should be noted that segmenting devices does not provide a final solution, but is useful to reduce the number of monitoring devices to contend with at a given time.

Figure 16:
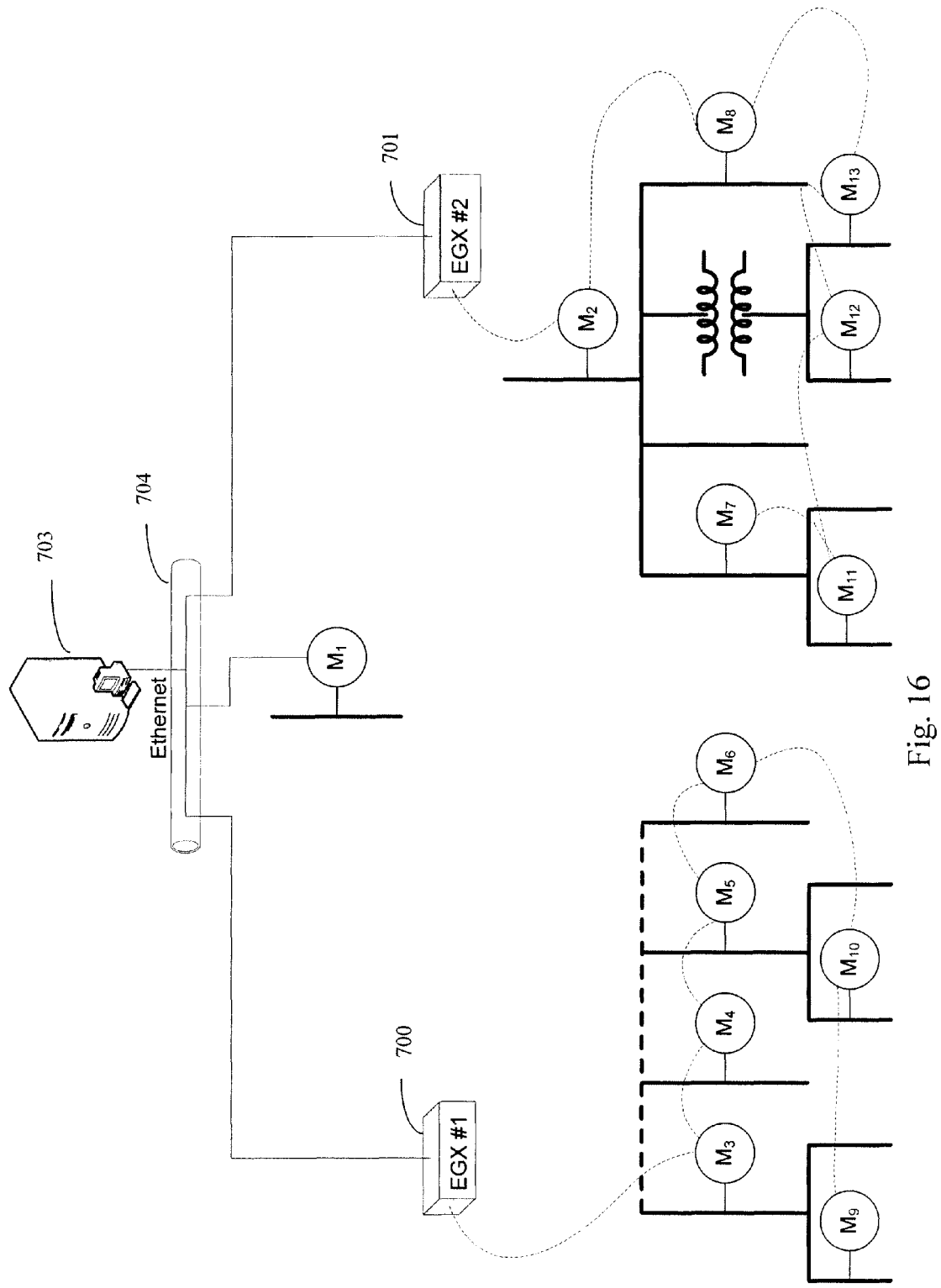
FIG. 16 is a diagrammatic illustration of hierarchies of the devices in each of the segments illustrated in FIG. 15.

The next step is to determine the hierarchy of the devices within each of the segments 710-712, using the algorithms described above. This step may result in multiple mains within each multiple-device segment because of the practical limitations of segmenting an unknown monitoring system. FIG. 16 illustrates the results after completing this step. Note that one bus is still shown with a broken line to indicate a potential relationship.

Figure 17:
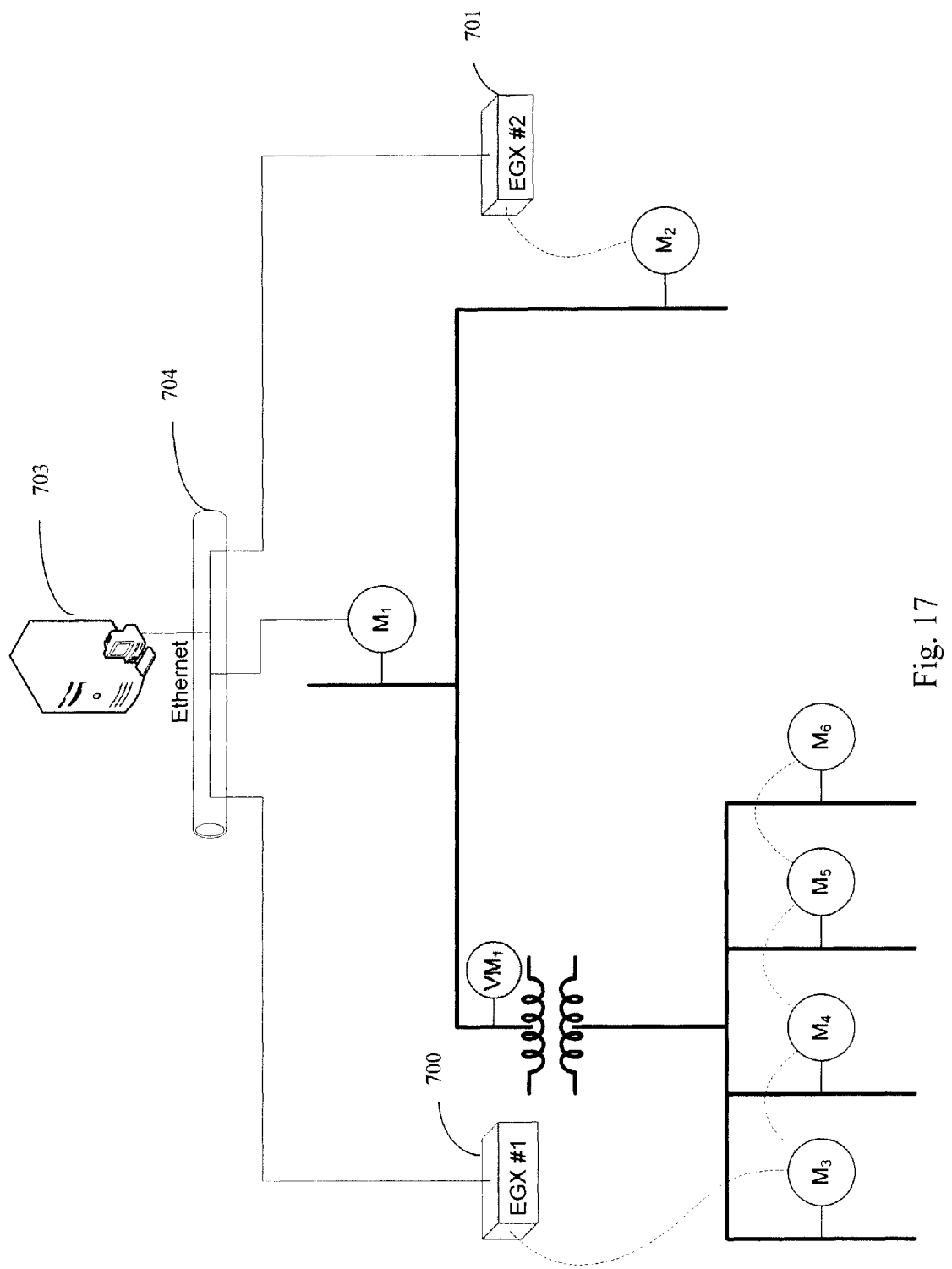
FIG. 17 is a hierarchical representation of a power monitoring system comprising the top-most devices in all the segments illustrated in FIG. 15.
Figure 18:
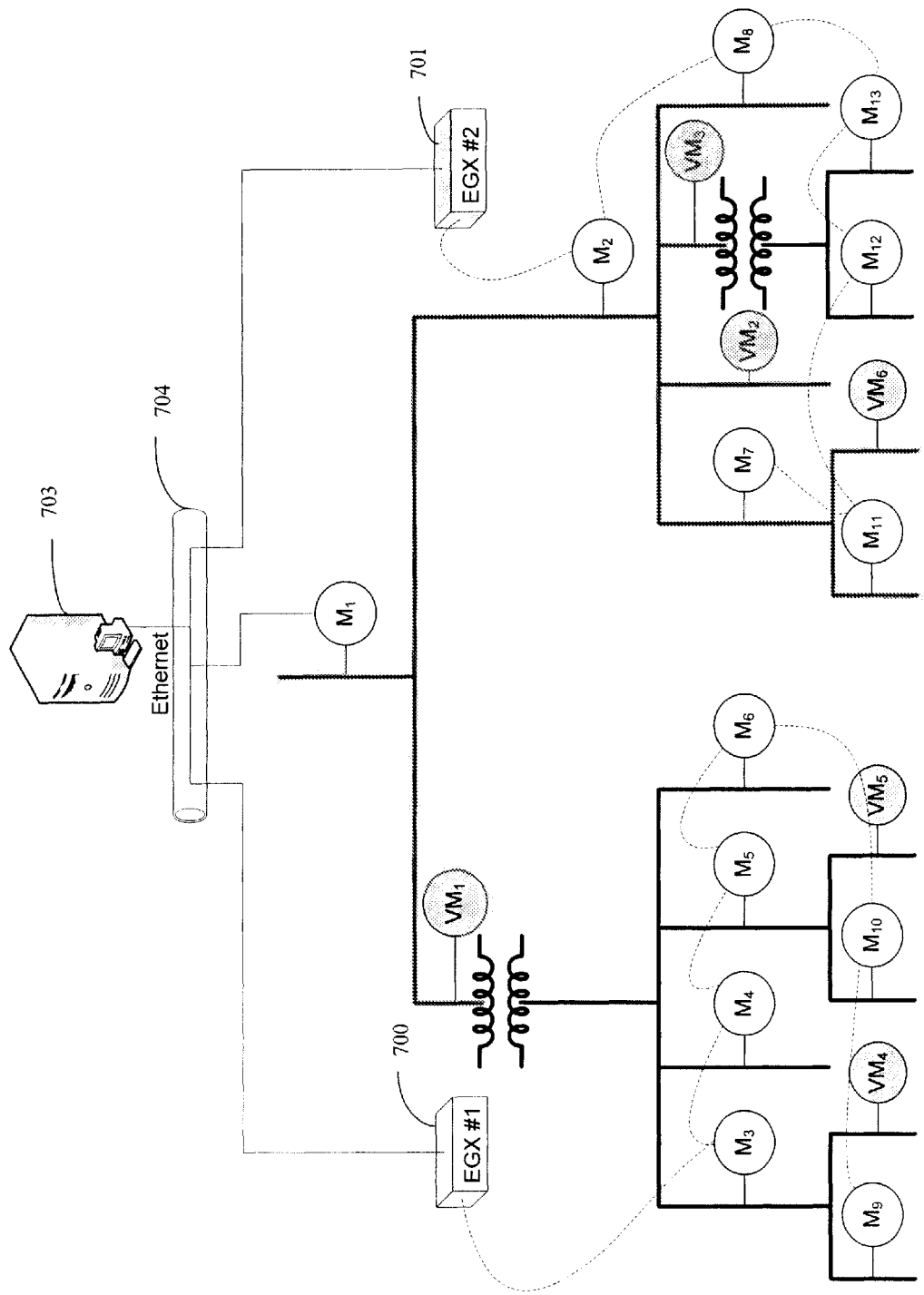
FIG. 18 is a hierarchical representation of a power monitoring system comprising all the devices in the segments illustrated in FIG. 15.

Once the hierarchy is determined for the devices within each segment, the top-most devices from the three segments 710-712 are identified ($M_1$,$M_2$,$M_3$,$M_4$,$M_5$,$M_6$, respectively) and grouped into a special subset of all devices on the monitoring system. This special subset of devices is then passed through an algorithm to determine its hierarchical order, as depicted in FIG. 17. Once the hierarchy of the special subset is determined, its results are then compiled with the results of the segment hierarchies into the final hierarchy for the entire monitoring system. FIG. 18 illustrates the final hierarchy for the simple monitoring system used in this example. It should be noted that a final re-evaluation of the entire hierarchy is performed to validate the provided solution. If a device or devices are found to be located incorrectly through this re-evaluation, the algorithm may re-position that device or devices accordingly.

Using the concepts described above, it is possible to conclusively establish the hierarchy of an extensive monitoring system that might otherwise be indeterminate. Furthermore, it is possible to conclusively determine additional aspects about the monitoring system, as discussed below in connection with "Additional Hierarchy Data." While this example only uses one internal parameter (communications configuration data) and one external parameter (voltage data), other unique internal and external parameters may be used in place of, or in conjunction with, those specified in this example.

Figure 19:
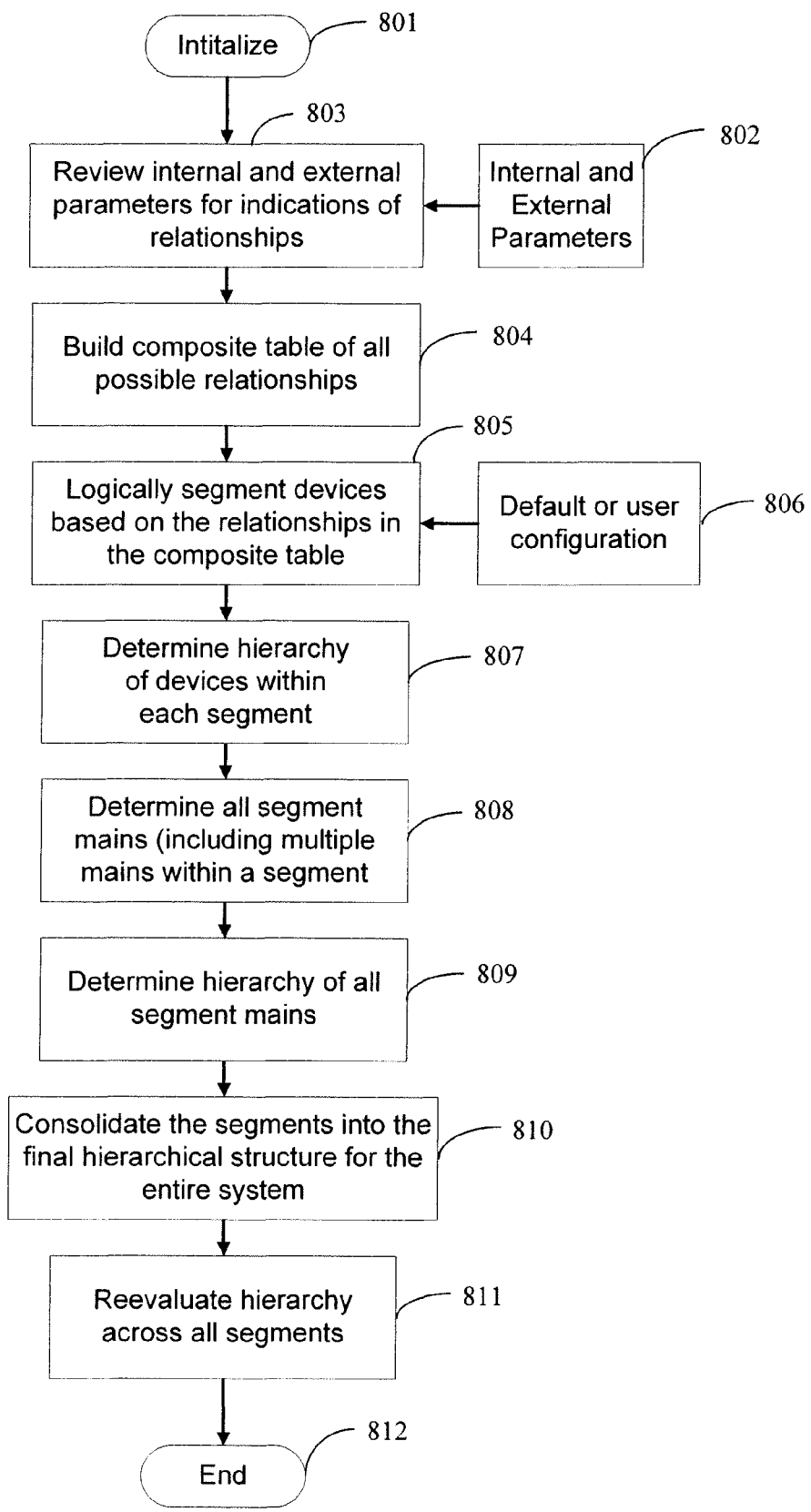
FIG. 19 is a flow chart diagram of a process for segmenting a power monitoring system.

FIG. 19 illustrates a flow chart for segmenting extensive monitoring systems into manageable segments for processing. After initializing the system at step 801, both internal and external parameters 802 are reviewed for indications of potential relationships at step 803. All potential relationships are compiled in a composite table at step 804, and then all devices in the system are logically segmented at step 805, based on the relationships in the composite table. A default or user configuration 806 may be used to allow manual enhancement of the segmentation or to improve the efficiency of the segmentation.

At step 807, the algorithm determines the hierarchy of the devices within each segment, as described above in connection with FIGS. 15 and 16. Then all the main devices in each segment are determined at step 808, and the hierarchy of all the main devices is determined at step 809, as described above in connection with FIG. 17. Finally, at step 810, the segments are consolidated into the final hierarchical structure for the entire system, as described above in connection with FIG. 18. At step 811, the hierarchy across all segments is re-evaluated, and then the subroutine ends at step 812.

It is preferred that the algorithm allow as many devices as deemed necessary by the end user to be located at the same point of a monitoring system and still be considered for hierarchical purposes. Multiple devices located at the same point in a monitoring system may be placed in series with and adjacent to each other at the same point in the hierarchy. There may be limitations in determining the exact sequence of device installations at the same point due to the accuracy considerations associated with instrument transformers ("IT's") and the devices themselves.

Devices that are connected at the same point in a monitoring system have unique characteristics that allow them to be easily identified. A few of these device characteristics include:

1. The statistical correlation of their electrical parameters is nearly 100%.
2. The measured values of their electrical parameters are nearly identical.
3. Device configurations may be identical.

The algorithm recognizes devices with nearly identical characteristics and marks them as being installed at the same point in the monitoring system's hierarchy. A more detailed examination is then performed by pseudo-synchronously sampling data from these devices with the intent to place them in logical sequential order. The sequential order is determined based on some combination of the following data:

Power reading
Voltage readings
Current readings
Correlation values with other linked devices.

By analyzing these parameters and by using the basic principles of Ohm's Law, a logical sequential order for a given set of devices within the imposed accuracy constraints can be determined.

There are thousands of discrete components that make up each individual monitoring system device. Monitoring devices often require instrument transformers (CT's and/or VT's) to provide them with suitable currents and voltages. Each device (and its accessories) is inherently susceptible to some degree of inaccuracy. Factors that contribute to the inaccuracies of monitoring system devices and their accessories include temperature variations, aging components, damaged or defective components, poor design, flawed firmware/algorithms, misapplication of components, erroneous configuration, bad calibration, etc.

The accuracy of monitoring system devices can influence the ability of the hierarchy algorithms to efficiently and effectively determine a monitoring system's layout. Even seemingly trivial inaccuracies have the potential to confound an algorithm that is largely based on fundamental "conservation of energy" laws. It is imperative that the hierarchy algorithm be robust enough to tolerate some level of intrinsic inaccuracy within the system.

The system described and illustrated herein is able to address both configuration and intrinsic inaccuracy considerations—each by distinct means. Configuration problems, such as incorrect VT/CT ratios, can be detected by the algorithm due to discrepancies in the hierarchy data from the monitoring devices. For example, the strongest data correlations occur with devices installed adjacent to each other. These data correlations are subject to relative changes in the data, but not to the data magnitudes themselves. Incorrect VT/CT ratios affect the magnitude of the data, but not the relative changes. So, if analysis shows that the highest correlation exists between two devices that cannot be linked because of discrepancies in the data magnitudes, then it is likely that a problem exists with the VT/CT ratios. This condition is noted, and the end user is notified accordingly.

Another configuration issue that affects accuracy is the use of scale factors. By scaling data, significant digits may be removed through the rounding process, affecting the precision of the data. While the loss of significant digits may not be critical for large load changes, it has the potential to meaningfully impact smaller load changes. Because the hierarchy algorithm is based on the load variations between monitoring devices, quantizing the data from one or more devices potentially masks correlative relationships. In order to detect this problem, the algorithm checks devices to determine whether they are configured to scale the pertinent data. If scaling is detected, the algorithm can either disable the scaling during the collection of data or notify the end user to do the same.

While configuration problems may or may not exist, the inherent inaccuracies of monitoring devices (and their instrument transformers) are always a dynamic to be considered. As stated above, there are many sources that can contribute to this issue. Even if these sources are somehow mitigated, every device is limited in its ability to measure data to some degree of precision.

Figure 20:
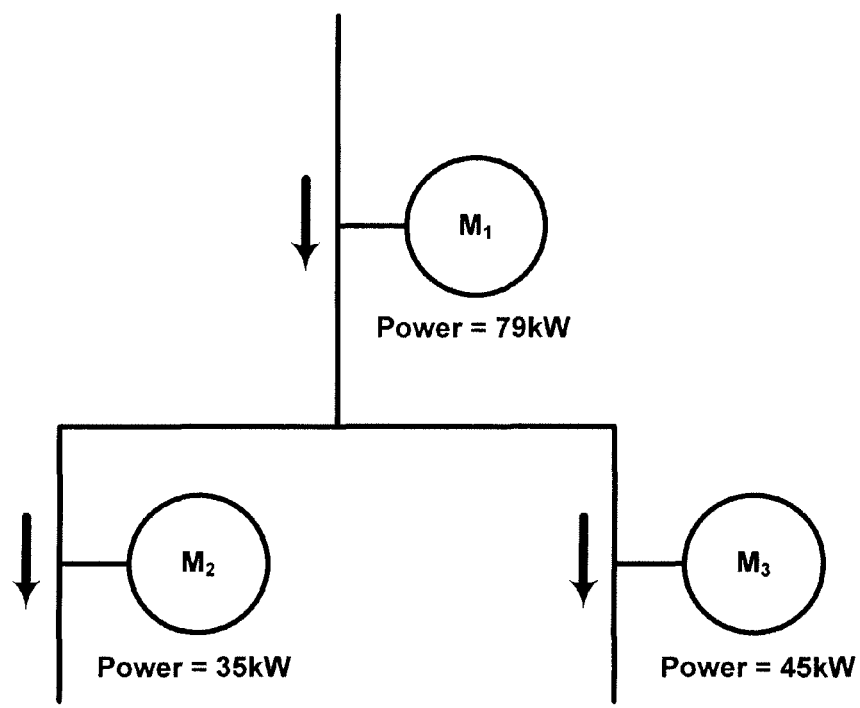
FIG. 20 is a representation of a portion of a power monitoring system indicating a consumption of power greater than the power being delivered.

FIG. 20 provides a simple illustration of how trivial device inaccuracies have the propensity to confound an algorithm based on the principles of "conservation of energy." In this figure, three devices $M_1$, $M_2$, and $M_3$ all show the power to have the same directional flow (down). The main device $M_1$ measuring the total power into the system shows a power flow of 79 kW. The two devices $M_2$ and $M_3$ downstream from the main device $M_1$ measure 35 kW and 45 kW, respectively, for a total of 80 kW. It is apparent that $M_1<(M_2+M_3)$, defying basic energy conservation laws. Since this is impossible, there are two logical conclusions to be drawn from this discrepancy: (1) that 1 kW of power is being injected into the system through some supplemental path (doubtful), or (2) that devices $M_1$, $M_2$ and/or $M_3$ are not providing precise measurements (plausible). In short, the combined inaccuracies of these devices (and/or their accessories) will lead the hierarchy algorithm to select device $M_3$ as a child of device $M_1$ (because it has the highest correlation with device $M_1$ due to its larger load) and place device $M_2$ as an orphan device. The end user will then have to manually move device $M_2$ as a child under device $M_1$, which is not optimal because of the required user interaction.

An algorithm is able to manage these incongruities and provide the correct hierarchy to the end user without requiring manual intervention. The algorithm examines a combination of both the correlation coefficient and the measured quantities from the time-series data received from the devices in the monitoring system. To use the system in FIG. 20 as an example, the time-series data from device $M_2$ can be correlated with the difference between the time-series data received from devices $M_1$ and $M_3$ ($M_1$–$M_3$). The correlation coefficient is approximately unity, meaning that device $M_2$ should unquestionably be a child of device $M_1$. The time-series data from device $M_2$ is slightly higher than the difference between the data from devices $M_1$ and $M_3$ (i.e., $M_2 > \approx M_1 - M_3$), so a tolerance is allowed. Device $M_2$ is then correctly placed as a child under device $M_1$ despite the power flow discrepancy.

Each monitoring system must obey the laws of "conservation of energy"—the total flow of energy into a system equals the total flow of energy consumed by that system, either through loads or losses. In a nutshell, all of the parameter being measured must be accounted for. FIG. 20 illustrates a system in which it appears that more energy is being consumed than is being delivered (1 kW). Conversely, other systems may appear to be delivering more energy than is being consumed.

All systems experience some degree of losses, inaccuracies and/or unmonitored loads. In order to bring the system into equilibrium, these factors must be accounted for. It is a difficult task to discriminate which of these factors may be producing a discrepancy in the consumption of energy, and to what extent. Moreover, a discrepancy in energy may be due to any combination of these three factors.

Figure 21:
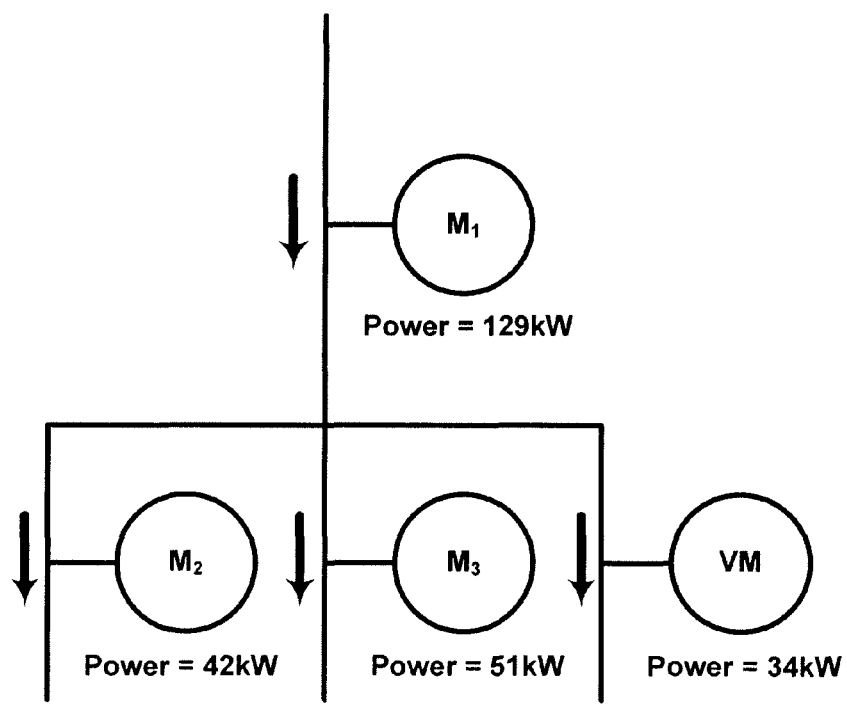
FIG. 21 is a representation of a portion of a power monitoring system indicating a consumption of power less than the power being delivered, with a virtual meter VM representing an unmonitored load.

To manage these discrepancies, the algorithm preferably relies on a fixed or relative (e.g., percentage) threshold (default or configured by the end-user) to determine how to categorize extraneous consumptions of energy. It is also possible to parse these extraneous consumptions of energy into some combination of losses, inaccuracies, and/or unmonitored loads depending on the end-user's preference. To illustrate how this is done, FIG. 21 shows an electrical system with 36 kW of unaccounted-for power consumption. In this case, the algorithm is configured to assume losses and inaccuracies within the electrical system of roughly 1.5% (or 2 kW). The residual power is then assumed to be unmonitored load, resulting in a virtual load of 34 kW. A virtual meter VM reflects that unmonitored load.

Figure 22:
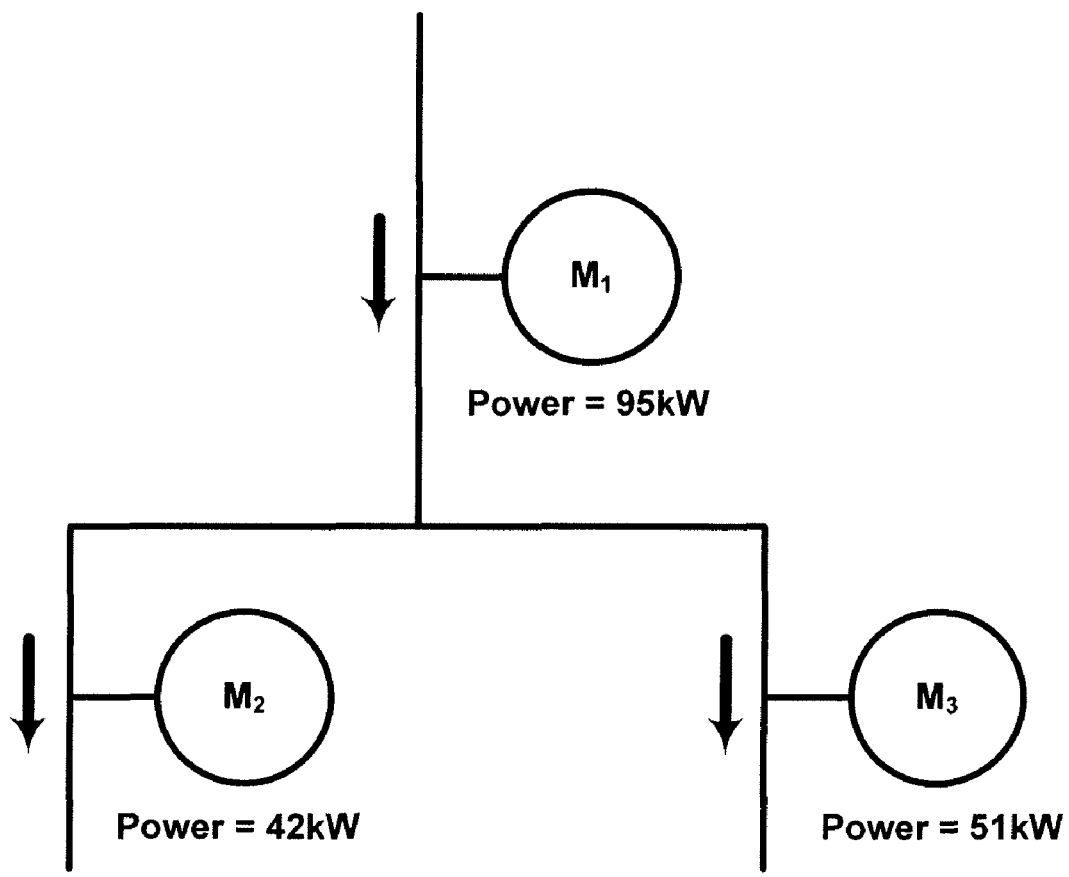
FIG. 22 is a representation of a portion of a power monitoring system indicating a consumption of power less than the power being delivered.

FIG. 22 shows another electrical system with 2 kW of unaccounted power. With the same configuration for losses and inaccuracies (roughly 2.1%), the residual power is negligible and the electrical system is considered to have monitoring devices installed on all circuits. Again, the end-user is allowed to configure the disbursement of residual power as deemed appropriate.

Accurately determining the hierarchy of a monitoring system requires time to synchronously collect and then process/analyze data from each device. Comparatively speaking, collecting the data takes much more time than processing/analyzing the data due to the correlative aspects of the hierarchy algorithm requiring load variations to properly function. Because of this fact, it is beneficial to consider the data collection process to improve the efficiency of the hierarchy algorithm.

Two techniques are used to improve the efficiency and speed at which the monitoring system hierarchy may be obtained. The first technique focuses on the periodicity of taking data samples, and the second technique focuses on number of data samples required to be taken. Used in concert, these techniques can optimize the processing time for resolving a monitoring system hierarchy.

Figure 23:
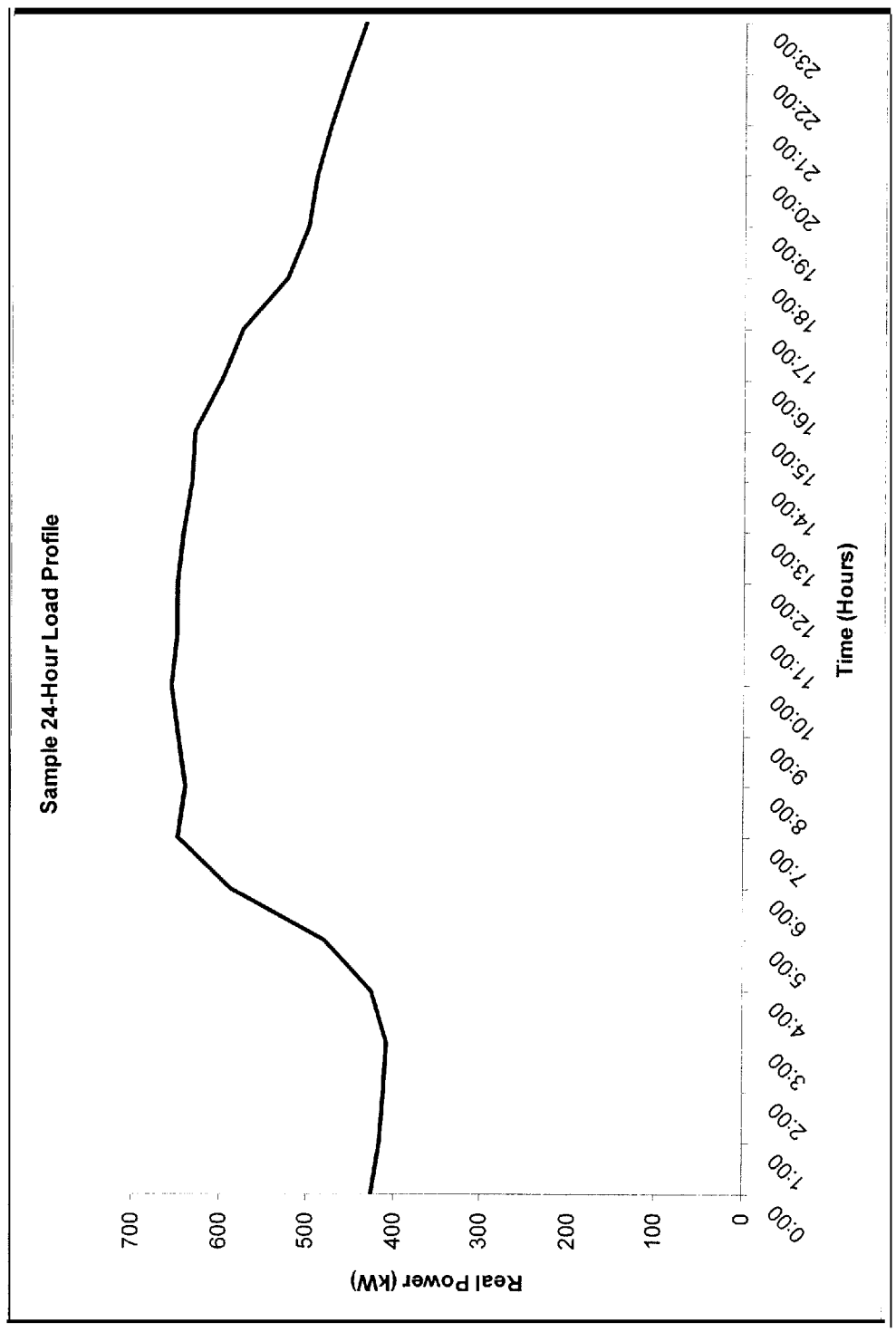
FIG. 23 is a sample of a customer's 24-hour load profile.

All energy consumers experience changes in their electrical system's operational parameters and characteristics throughout a given day due to its routine operation. For example, as each circuit is closed or opened, a facility's load fluctuates accordingly. Because every monitored system is distinctive due to its unique operation and/or load types, there is no predetermined number of data points that is optimum for all types of energy consumers. FIG. 23 illustrates one example of an energy consumer's load profile over a 24-hour period.

By their very nature, statistical correlative functions (similar to the function upon which the hierarchy algorithm is based) are more effective and efficient when analyzing data exhibiting frequent changes. Conversely, data that does not change or fluctuates slowly proves more difficult when it is evaluated with correlative functions. In order to accommodate the unpredictability of any given facility's operational characteristics, an "adaptive method" may be used to determine the optimum sample rate required to most effectively and efficiently build the hierarchy algorithm's time-series of data from the monitoring devices. One approach would be to incorporate an adaptive method to perform a running analysis of the change in power with respect to time (dP/dt) and adjusts the sample interval accordingly. As the rate-of-change of a device or facility's load profile changes (increasing or decreasing), more data samples are taken.

Figure 24:
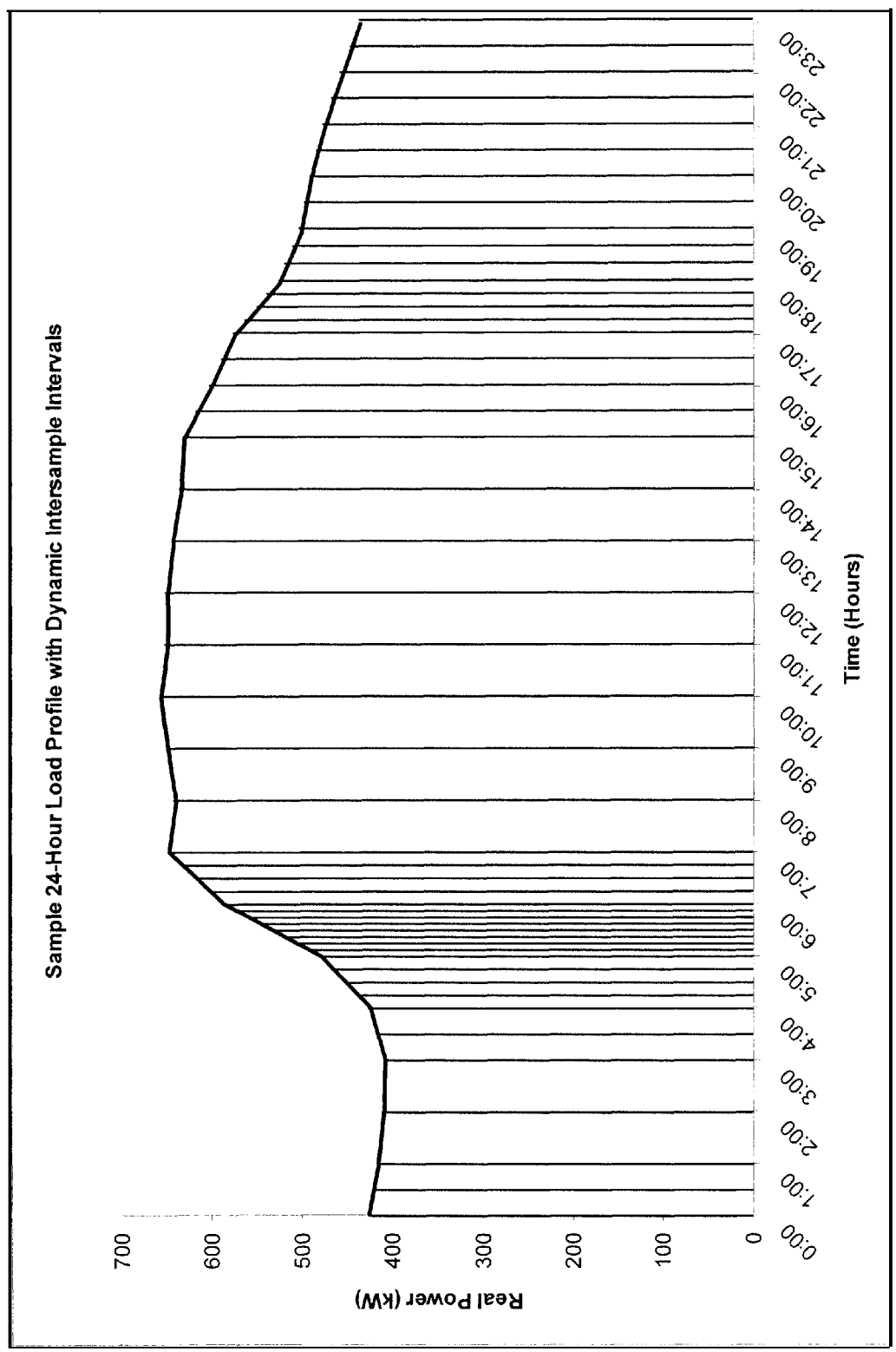
FIG. 24 illustrates an example of adaptive sampling for the load profile of FIG. 26.

FIG. 24 illustrates an adaptive sampling method using the load profile shown in FIG. 23. After each data sample is taken from the monitoring devices, the time-series data from one or more devices is analyzed to determine whether or not to increase or decrease the intersample interval. If the rate-of-change of power is increasing or decreasing from the previous data sample, then the intersample interval is decreased. However, if the rate-of-change of power is relatively constant, then the intersample interval may remain constant or be increased. Lookup tables may be used or equations may be developed to determine the increase or decrease of the inter-sample interval based on changes (relative or absolute) in operational parameters such as power. Using this adaptive method for adjusting the intersample interval increases the significance of the data, resulting in a more efficient algorithm that provides faster results. It also minimizes the communications network traffic between the devices and the computer executing the algorithm.

In order to further increase the efficiency of the hierarchy algorithm, the number of data samples taken to ascertain a monitoring system's hierarchy may be reduced when appropriate. While requiring a fixed number of data samples is a simple approach, it may ultimately provide too much or too little data. The consequence for sampling too much data is a longer than necessary period for determining the monitoring system's hierarchy. Moreover, it creates unwarranted traffic on the communications network system. The consequence for sampling too little data is even worse—an incorrect solution may be provided to the end-user.

In order to address these concerns, a "sample and assess" method may be used. Data samples are taken from the monitoring devices and periodically assessed by the hierarchy algorithm. Similar to the adaptive method described above, the sample and assess method relies on changes (though not necessarily correlative changes) in the determined hierarchy to adjust the periodicity that the data is assessed. Finding more hierarchical changes from assessment to assessment necessitates a longer interval between assessments. As each assessment shows a decrease in hierarchical changes, the rate of assessment is increased until some number of sequential assessments provides identical solutions. Once these sequential assessments are in concurrence, the hierarchy is assumed to be determined.

In order to minimize errors in the monitoring system's determined hierarchy, the algorithm may reassess its conclusions both immediately after a device has been placed and continuously thereafter. A device's initial placement in the hierarchy is based on its correlation value, where the correlation is greater than zero. The initial placement is also contingent on the power at the device being less than (or greater than within some tolerance) the power of the device it is being placed under (its parent). The tolerance provides flexibility for accuracy issues when two devices are monitoring the same load. For example, if the tolerance is set to 5%, then the device could be placed under a device simultaneously consuming 5% less energy. The tolerance also provide flexibility for accuracy issues where all downstream paths are being monitored (FIG. 20).

Once the device is placed within the hierarchy and its time-series data is subtracted from the parent device's residual time-series data, the correlation between the device and parent are re-checked to ensure a drop in their correlation (which is expected). The device correlation with the parent device should be greater than a correlation threshold. If not, the newly determined relationship between the device and the parent device may be broken should some other device exhibit a better relationship. In short, device correlations are checked both before and after the devices are placed in the hierarchical structure to ensure correct placement.

There are instances when the evaluation may initially conclude that a given device should be placed at one point in the hierarchical structure. However, further evaluation may determine that the original placement of that same device is incorrect and it actually belongs somewhere else in the hierarchy. For example, if a first device's correlation with a second device is higher than the first device's correlation with its current parent, and the first device is not already related to the second device, then the first device is removed from its current parent. The first device is then treated as an unevaluated device and is completely re-analyzed. Extensive systems may be especially prone to this occurrence given a large number of devices to resolve.

Figure 25:
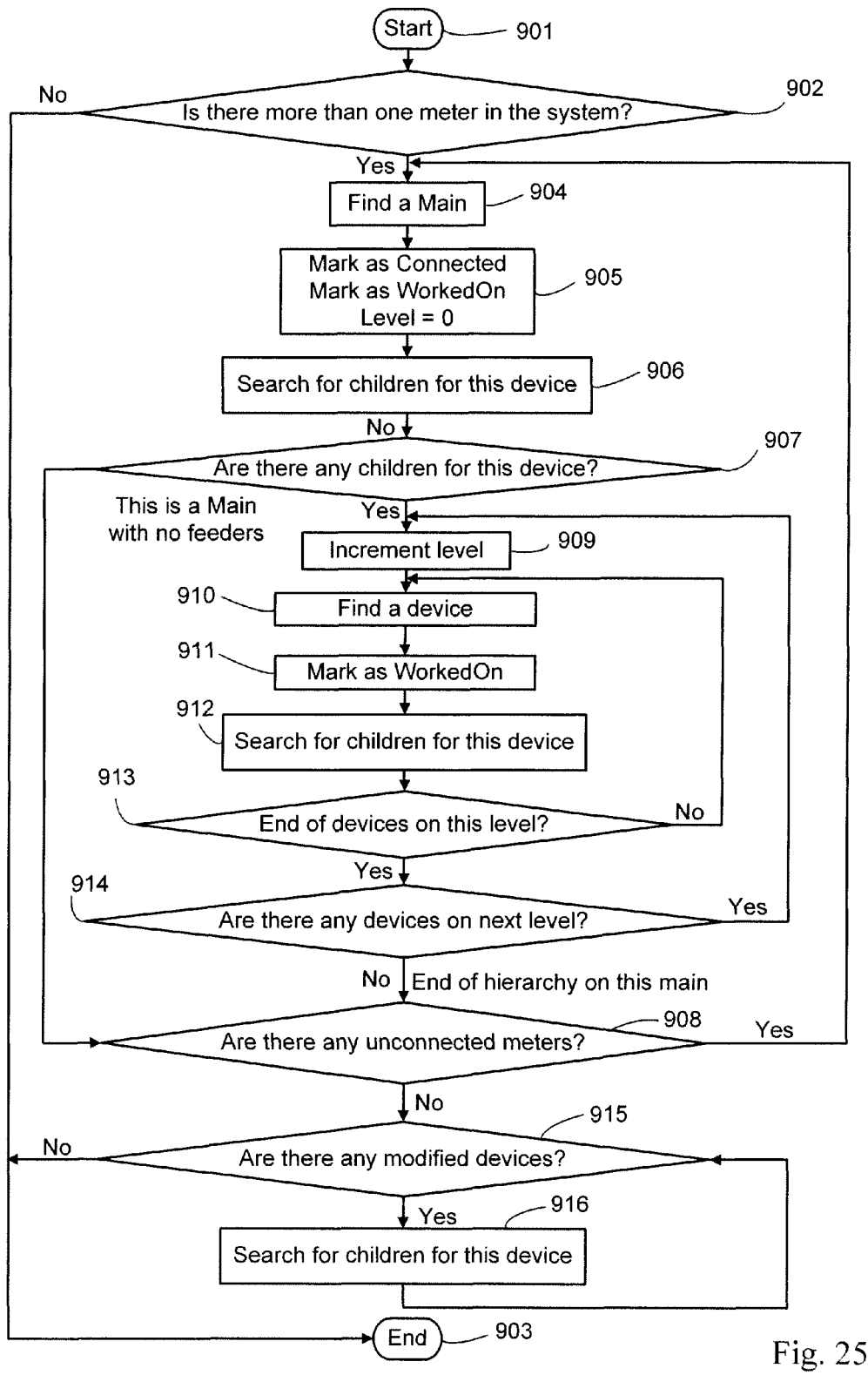
FIG. 25 is a flow chart diagram of a process that implements enhanced hierarchy determination and evaluation techniques.

FIG. 25 illustrates a flow chart for a process that implements certain of the hierarchy determination and evaluation techniques described above. After starting this process at step 901, the process determines whether there is more than one device in the system being monitored, at step 902. If the answer is negative, the process ends immediately, at 903. If the answer at step 902 is affirmative, the process finds a "main" device, i.e., a device that has the maximum power level in the system being monitored, at step 904. That main device is then marked as "Connected" and "WorkedOn," and assigned a level of zero, at step 905. "Connected" means the main device has been placed in the hierarchy, and "WorkedOn" means the children of the main device have been identified and linked to the main device in the hierarchy. The level of the main device is always designated Level 0, then the children of the main device are assigned Level 1, the grandchildren of the main device are assigned Level 2, and so on.

At step 906, the process searches for children of the main device, and then step 907 determines whether any such children exist. A negative answer at step 907 means the main device has no children, and thus the process jumps to step 908 to determine whether there are any remaining unconnected devices that have not been linked into the hierarchy. An affirmative answer at step 907 causes the process to advance to step 909 where the level is incremented by one, e.g., from level 0 to level 1, which is the level for children of the main device.

At step 910 the process selects one of the devices at level 1 and then marks the selected device as "WorkedOn" at step 911 to indicate that the children of the selected device (grandchildren of the main device) have been identified and linked into the hierarchy. At step 912, the process searches for children of the selected device, and then step 913 determines whether there are any remaining devices on this level (e.g., level 1). A negative answer at step 913 means additional devices exist on this level, and thus the process repeats steps 910 through 913 for the next device on Level 1. An affirmative answer at step 913 causes the process to advance to step 914 to determine whether there are any devices on the next level (e.g., Level 2). If the answer is affirmative, the process returns to step 909 to increment the level by one and then repeat steps 910 through 914.

A negative answer at step 914 means there are no remaining unconnected devices that have not been linked into the hierarchy, and thus the hierarchy for this particular main device is ended. The process proceeds to step 908 to determine whether there are any unconnected devices (e.g., orphans) remaining. If the answer is affirmative, the process returns to step 904 to attempt to find another main device and, if so, determine its hierarchy. A negative answer at step 908 advances the process to step 915 to determine whether any device in the hierarchy has been modified. If the answer is affirmative, the process searches for children of the modified device at step 916, and repeats this search as long as step 915 continues to yield an affirmative response. A negative answer at step 915 ends the process at step 903.

Figure 26A:
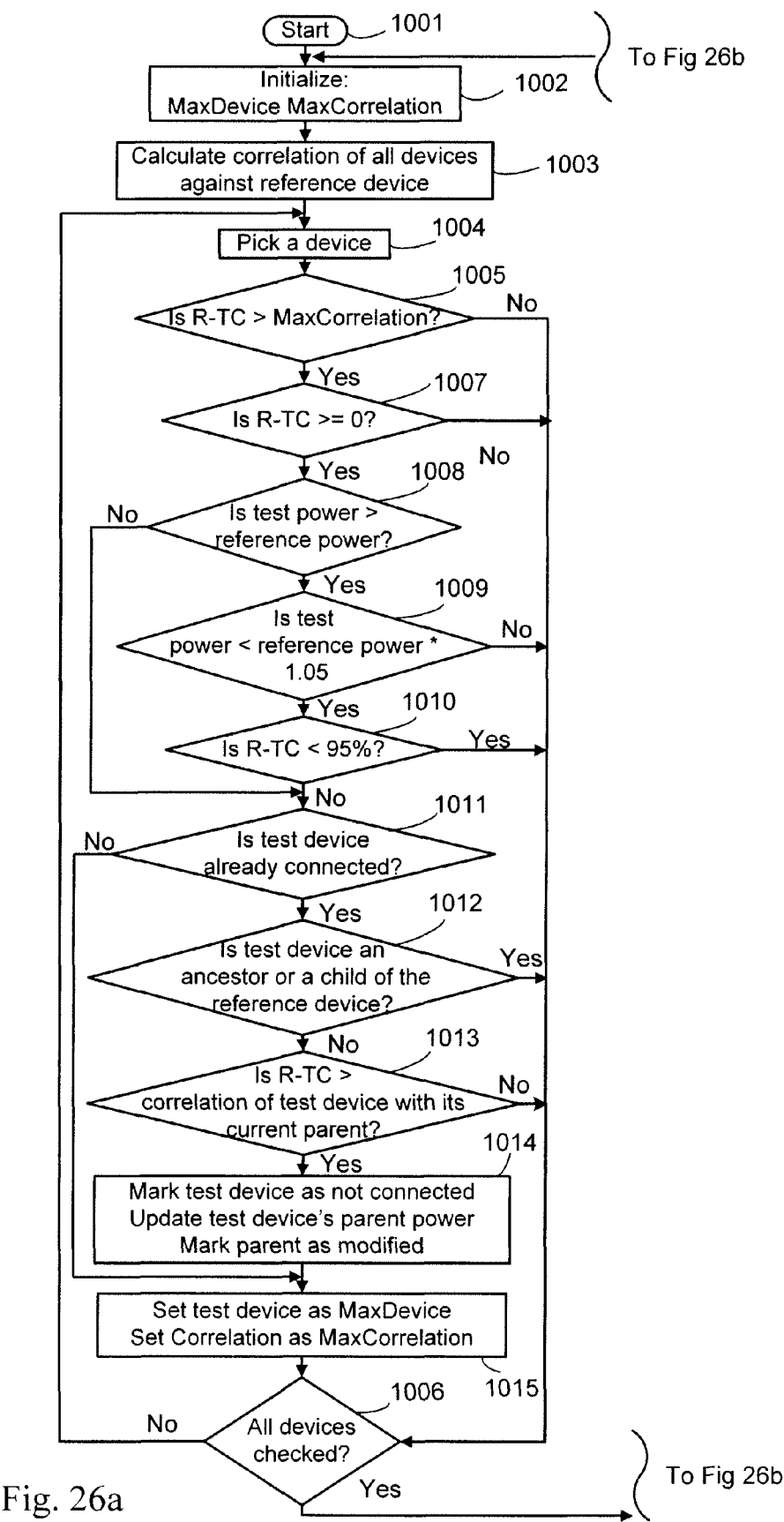
FIG. 26 is a flow chart diagram of a process that searches for children of a reference device.
Figure 26B:
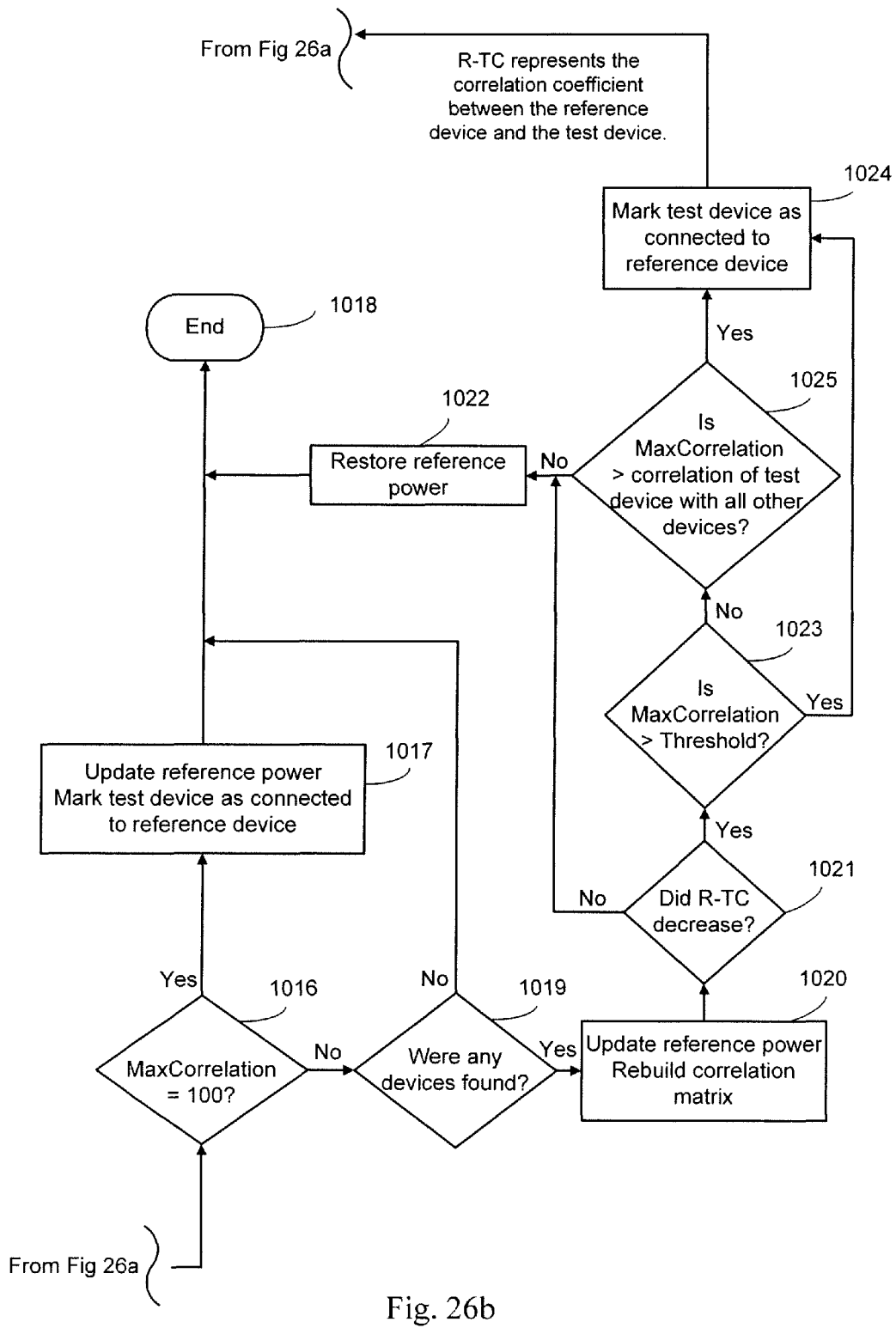

FIG. 26 illustrates a flow chart for a process that searches for children of a reference device. This process can be used, for example, for the searches conducted at steps 906, 912 and 916 of the process of FIG. 25. After starting this process at step 1001, the process initializes "MaxDevice" and "MaxCorrelation" at step 1002. At step 1003, the process calculates correlation coefficients for all devices against the reference device.

At step 1004, the process picks a "test" device to be evaluated, and then step 1005 determines whether the correlation coefficient for that device is greater than the "MaxCorrelation" value. A negative answer at step 1005 indicates that the test device cannot be selected as a potential child of the reference device at this time, because a potential child must have correlation coefficient greater than the "MaxCorrelation" value. Thus, a negative answer at step 1005 causes the evaluation of the test device to be terminated by jumping to step 1006 which determines whether all devices have been checked. An affirmative answer at step 1005 indicates that the test device is a potential child of the reference device, and thus the process advances to step 1007 to determine whether the correlation coefficient of the test device is greater than or equal to zero (i.e., not negative). If the answer is "no," indicating that the coefficient has a negative value, the evaluation of the test device to be terminated by jumping to step 1006, because the test device cannot be selected as a potential child of the reference device.

A positive answer at step 1007 advances the process to step 1008 to determine whether the power measured by the test device is greater than the power measured by the reference device. Since the test device is a potential child of the reference device, a negative answer is normally expected at step 1008, and such an answer advances the process to step 1011 to determine whether the test device is already connected to another device. If step 1008 produces an affirmative answer, the process advances to steps 1009 to determine whether the power measured by the test device is within 5% above the power measured by the reference device, i.e., within a 5% tolerance for inaccuracies due to rounding errors and the like. If the answer is affirmative, the process proceeds to step 1010 to determine whether the correlation coefficient of the test device is less than 95%. A negative answer at step 1009 or an affirmative answer at step 1010 ends the evaluation of this test device.

A negative answer at step 1010 advances the process to step 1011 to determine whether the test device is already connected to another device. This is the first step for a re-evaluation process carried out by steps 1011-1014. If step 1011 yields a negative answer, no further re-evaluation is required, and the process jumps to step 1015. An affirmative answer at step 1011 advances the process to step 1012 to determine whether the test device is an ancestor or child of the reference device. If the answer is affirmative, the re-evaluation is terminated by jumping to step 1006. If the answer is negative, the process advances to step 1013 to determine whether the correlation coefficient of the test device against the reference device is greater than the correlation coefficient of the test device against the parent device to which the test device is already connected. If the answer is negative, the re-evaluation is terminated by jumping to step 1006. If the answer is affirmative, the process advances to step 1014 to mark the test device as "not connected," to update the test device's parent power, and to mark that parent device as "modified." Step 1015 then sets the test device as the "MaxDevice" and sets the correlation coefficient for the test device against the reference device as the "MaxCorrelation" value. This ends the evaluation of the test device picked at step 1004.

Step 1006 determines whether all devices have been evaluated. If not, the process returns to step 1004 to select another test device and repeat the process described above in connection with steps 1005-1015.

When step 1006 indicates that all devices have been evaluated, the process advances to step 1016 which determines whether the current value of "MaxCorrelation" is 100. If it is, step 1017 updates the power reading from the reference device, and marks the test device as connected to the reference device, and then the process ends at step 1018. If the value of "MaxCorrelation" is not 100, the process advances from step 1016 to step 1019 to determine whether any devices were found. If no devices were found, the process is terminated at step 1018. If a device was found, the process advances to step 1020 to update the reference device's residual power (by subtracting the found device's power from the reference device's residual power), and to rebuild the correlation matrix accordingly. Step 1021 then determines whether the test device's correlation coefficient decreased, and if the answer is negative, step 1022 restores the previous residual power of the reference device, and then the process is ended at step 1018.

If step 1021 yields an affirmative answer, the process advances to step 1023 to determine whether the "MaxCorrelation" value exceeds a predetermined threshold. An affirmative answer advances the process to step 1024 where the test device is marked as "connected to the reference device," and the process returns to the original starting step 1002 to search for more children. If step 1023 produces a negative answer, the process proceeds to step 1025 to determine whether "MaxCorrelation" is greater than the correlation of the test device with all other devices. An affirmative answer advances the process to step 1024, and a negative answer advances the process to step 1022 to restore the previous residual power of the reference device, and then the process is ended at step 1018.

In many monitoring systems there are devices installed at locations that either experience minimal load variance or have little to no load at all. For whatever reason, the correlative aspect of the algorithm may be unable to ascertain a placement for such a device within the monitoring system hierarchy. In these instances, other device readings or configuration parameters may be used in an attempt to place the device in question within the hierarchical structure. For example, voltage measurements (phase, average, fundamental, harmonic component, total harmonic, unbalance, symmetrical components, etc.) can be used to determine the specific bus to which a device is connected. Configuration parameters such as communications setup data, VT/CT ratios, etc. can be used to help place a device within the monitoring system hierarchy. In short, either individual internal or external parameters or combinations thereof can be used to successfully locate a "difficult" device.

Devices that the hierarchy algorithm is unable to place are assigned an "orphan" status and placed as a new system adjacent to the other determined systems. The hierarchy algorithm allows the end-user to place (e.g., by "drag and drop," etc.) the orphan devices at their installed locations within the hierarchy, and the hierarchy database is updated. Once an orphan device is placed, the spatial context of the data from that device may be leveraged accordingly.

Evaluation of data from each monitoring system device can provide more useful information to the end-user. For example, reading the voltage data from each monitoring device allows the algorithm to determine the placement of transformers within the monitoring system hierarchy. The algorithm can determine the nominal primary and secondary voltages for a transformer using both device voltage readings and data from a lookup table with standard nominal voltages. This concept can be incorporated internationally by using some combination of device voltage readings, the nominal system frequency, and the standard nominal voltage lookup table.

Data from the monitoring devices can also be used to provide more details to the hierarchy one-line diagram. Configuration information can be used to show communication system hierarchies, configured VT/CT ratios at each device, security settings and status throughout the system, and any other setup parameter. Real-time readings from the devices can be affixed to a specific device within a hierarchy console. Data can be viewed from a discrete device, from a system-wide vantage, or from any combination thereof. Ultimately, the end-user is conveniently able to access more information in a more useful format due to its spatial context.

Providing a method to automatically determine a monitoring system's hierarchy is an extremely valuable tool. The real value lies more in the monitoring devices' context within the monitoring system than in a simple representation of the monitoring system (although the representation can be useful too). There are many applications that can be derived from the knowledge of where a monitoring device is placed with respect to every other device. The beauty of a monitoring system hierarchy is that it can be made to be useful even if it is erroneous.

Figure 27:
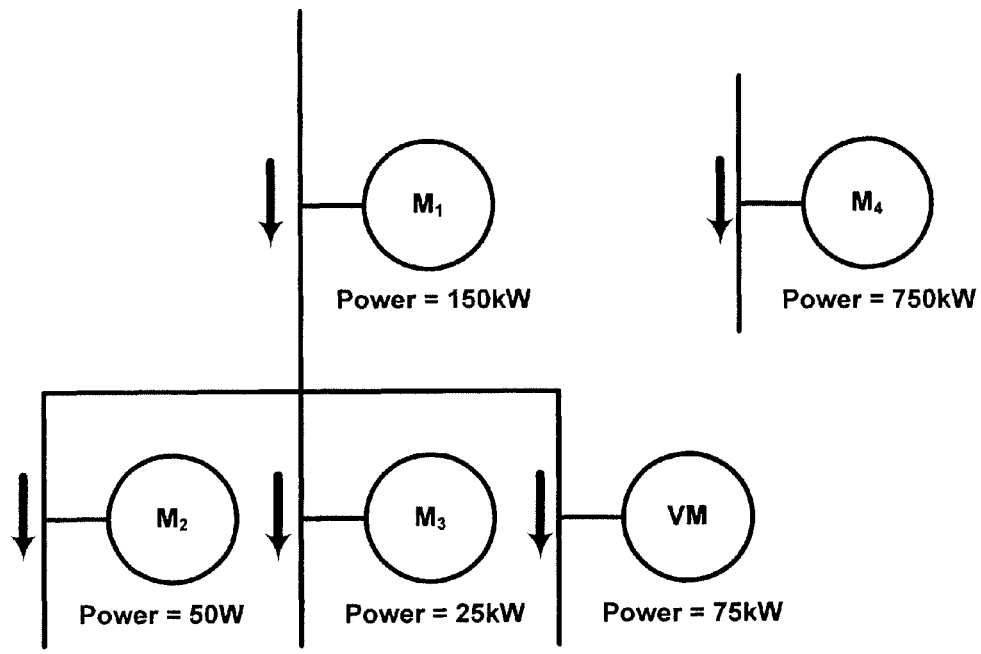
FIG. 27 is a diagrammatic illustration of a portion of a monitoring system hierarchy that includes an orphan device represented by a virtual monitoring device.
Figure 28:
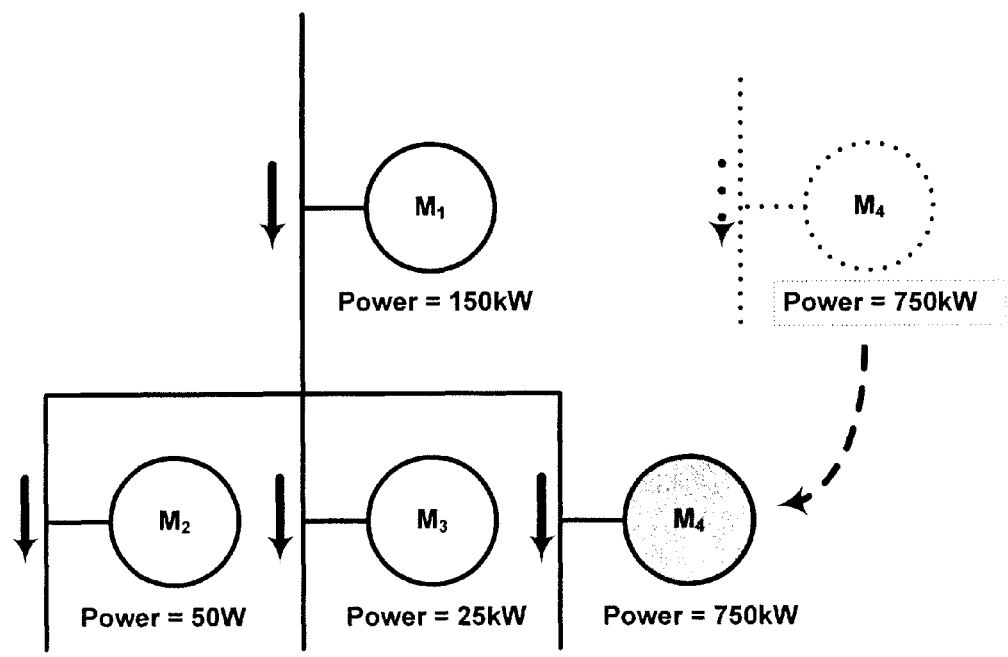
FIG. 28 is a diagrammatic illustration of the hierarchical portion shown in FIG. 27 with the orphan device placed into the hierarchy.

To illustrate this point, assume that a monitoring system hierarchy as shown in FIG. 27 has been determined for a small system using the hierarchy algorithm. The end-user believes that an orphan device $M_4$ actually should be placed below a parent device $M_1$, and thus moves $M_4$ down as a child device as shown in FIG. 28. However, the algorithm is able to determine that re-situating device $M_4$ below device $M_1$ upsets the logical order of the hierarchy because there is now more power being consumed through device $M_4$ than is being passed through device $M_1$. By evaluating the correlations between the parent device $M_1$ and its purported children ($M_2$, $M_3$ and $M_4$), a logical determination can be made as to whether or not device $M_4$ is actually a child of device $M_1$. It is further possible to hypothesize the root cause of the problem by evaluating each potentially related devices' ($M_1$, $M_2$, $M_3$, $M_4$) configuration settings, and notify the end-user accordingly.

For this example, the correlation between the time-series data for device $M_4$ and the residual time-series data for device $M_1$ would first be evaluated. In this case, let's assume that the correlation is found to be extremely high meaning that there is a strong likelihood that devices $M_1$ and $M_4$ are related. Internal and external voltage and current data from device $M_4$ would be then be compared with devices $M_1$, $M_2$ and $M_3$ to locate any discrepancies. In this example, the CT ratio in device $M_4$ appears to be off by a factor of 10. By hypothetically adjusting the CT ratio by a factor of 10, the algorithm determines that there is a high confidence the end-user's placement of the orphan device $M_4$ was correct. This conclusion can be further validated by evaluating device $M_4$'s time-series data against the residual time-series data for device $M_1$ with the adjusted CT ratio. The end-user will be notified of the conclusions (e.g., the CT ratio was improperly configured) and allowed to make their own assessment if they desire.

The example in this section is just one illustration of how the algorithm is able to identify and indicate potential configuration issues based on end-user adjustments to the hierarchy. As shown above, if the end-user requests an adjustment to the monitoring system hierarchy, the algorithm evaluates those changes to ensure accord within the entire hierarchical structure. These evaluations promote the integrity of both the software (including the determined monitoring system hierarchy) and the hardware configurations.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

A method of automatically linking two devices in a hierarchical representation of multiple devices in a monitoring system when the two devices are not linked because of discrepancies in the magnitudes of data measured by the two devices, comprises receiving time-series data from the two devices and determining the difference between the time-series data for the same time or time interval, determining a correlation coefficient between the two devices, and linking the two devices in the hierarchical representation if at least one of the conditions selected from the group consisting of (a) the correlation coefficient exceeding a predetermined threshold and (b) the difference falling within a predetermined tolerance range, is satisfied. The time-series data may comprise power measurements, and the monitoring system may be an electrical power monitoring system.

A method of reconciling the amount of power consumed with the amount of power delivered in a power distribution system having multiple paths equipped with a power monitoring system, comprises measuring the amount of power delivered to the power distribution system, measuring the amount of power consumed within the multiple paths in the power distribution system, increasing the measured amount of power consumed by a predetermined percentage of that amount to account for typical losses and inaccuracies in the power distribution system, thereby producing an adjusted amount of power consumed, subtracting the adjusted amount of power consumed from the measured amount of power delivered to determine an amount of residual power, and reporting the amount of residual power to the user of the power distribution system so that the user can allocate the amount of residual power among unmonitored loads served by the power distribution system. The amount of residual power may be reported as a measurement by a virtual power meter.

A method of collecting data from multiple devices in a monitoring system for use in determining the hierarchy of the devices, comprises receiving measurements of at least one parameter from the devices at a controllable sampling rate, determining the rate of change of the parameter, and adjusting the sampling rate for the devices according to changes in the parameter. The sampling rate may be increased for the devices as the rate of change of the parameter measured by at least one of the devices increases, and may be decreased for the devices as the rate of change of the parameter measured by the at least one device decreases. The monitoring system may be an electrical power monitoring system, and the data measurements may be power measurements.

A method of collecting data from multiple devices in a monitoring system for use in determining the hierarchy of the devices, comprises receiving data measured by the devices and using that data to determine the hierarchy of the devices successively, determining the number of changes in successive hierarchy determinations, and adjusting the time intervals between successive hierarchy determinations according to the number of changes in successive hierarchy determinations. The time between successive determinations may be increased as the number of changes in successive determinations increases, and may be decreased as the number of changes in successive hierarchy determinations decreases. The monitoring system may be an electrical power monitoring system, and the data measurements may be power measurements.

A method of determining the hierarchy of multiple devices in a monitoring system, comprises initially placing a first device in the hierarchy based on (a) a first correlation coefficient for the first device and a second device that is a potential parent of the first device and (b) data measurements from the first and second devices, subtracting data received from the first device from data received from the second device, and then determining a second correlation coefficient for the first and second devices, and comparing the first and second correlation coefficients and, if the degree of correlation decreases, comparing the first correlation coefficient with a predetermined threshold value to determine whether the placement of the first device is correct. The method may subsequently determine correlation coefficients for the first device and other potential parent devices, and compare each subsequently determined correlation coefficient with the first correlation coefficient for the first and second devices, and change the placement of the first device if at least one of the subsequently determined correlation coefficients indicates a greater degree of correlation than the first correlation coefficient for the first and second devices. The monitoring system may be an electrical power monitoring system, and the data comprises power measurements.

A method of determining the hierarchy of multiple devices in a monitoring system, comprises identifying at least one orphan device that is not placed within the hierarchy, placing the orphan device in a separate system and reporting the orphan device to the user of the monitoring system so that the user can place the orphan device at its actual installed location within the hierarchy, and accepting the orphan device placed by the end user in the hierarchy and connecting the accepted orphan device to other devices within the hierarchy accordingly. The monitoring system may be an electrical power monitoring system.

A method of determining the hierarchy of multiple devices in a monitoring system, comprises identifying at least one orphan device that is not placed within the hierarchy, placing the orphan device in a separate system and reporting the orphan device to the user of the monitoring system so that the user can place the orphan device at its actual installed location within the hierarchy, and recommending to the user a placement of the orphan device within the hierarchy based on at least one type of information selected from the group consisting of configuration parameters and data measured by the orphan device.

A method of determining the hierarchy of multiple devices in a power monitoring system, comprises receiving from the devices at least one type of information selected from the group consisting of configuration parameters and data measured by the devices, determining the existence and location of at least one power system component based on received data measured by the devices, and placing the power system component within the hierarchy of the devices. The at least one type of data may comprise voltage data measured by the devices, and the method may include determining nominal primary and secondary voltages for a transformer from the voltage data from a pair of the devices, and placing a transformer with the nominal primary and secondary voltages within the hierarchy between the pair of devices.

What is claimed is:

1. A method of automatically learning how multiple devices are directly or indirectly linked in a monitoring system, comprising:
    determining configuration parameters for said devices in said system,
    receiving data measured by said devices, and
    grouping said devices into multiple segments according to at least one type of information selected from the group consisting of configuration parameters and data measured by said devices.

2. The method of claim 1 which includes
    determining potential relationships of the devices in each segment according to at least one type of information selected from the group consisting of configuration parameters and data measured by said devices,
    determining the hierarchy of the devices within individual segments, and
    identifying the top-most device or devices in each segment and determining the hierarchy of said top-most devices.

3. The method of claim 1 wherein said configuration parameters include at least one parameter selected from the group consisting of (a) active demand synchronization pulses, (b) communication configurations, (c) scaling factors, (d) VT/CT ratios, (e) meter type and (f) system frequency.

4. The method of claim 1 wherein said data measured by said devices includes at least one parameter selected from the group consisting of power, voltage, waveform distortion, sequential components, flicker levels and temperatures.

5. The method of claim 1 in which said monitoring system is an electrical power monitoring system.

6. The method of claim 5 which includes determining the hierarchy of said multiple devices in said power monitoring system from said hierarchies of said multiple segments and said top-most devices.

7. The method of claim 5 in which one or more of said segments contains multiple devices at the same hierarchical point, and all said devices at the same hierarchical point are included in said hierarchy of said multiple devices in said power monitoring system.

8. A method of automatically positioning devices with similar characteristics in a hierarchical representation of multiple devices in a monitoring system, comprising:
    identifying devices that have substantially the same characteristics according to at least one type of information selected from the group consisting of configuration parameters and data measured by said devices, and
    positioning said identified devices at the same point in said hierarchy of said multiple devices in said power monitoring system.

9. The method of claim 8 which includes sampling data from said identified devices and placing said devices in a logical sequential order according to said sampled data.

10. The method of claim 8 in which said monitoring system is an electrical power monitoring system.

11. A method of evaluating proposed modifications to a hierarchical representation of multiple devices in a monitoring system, comprising:
    receiving a proposed modification to a device in a hierarchical representation of multiple devices in a monitoring system, and
    evaluating at least one type of information selected from the group consisting of (a) the correlation coefficient between said modified device and at least one adjacent device in said hierarchical representation, (b) configuration parameters, and (c) data measured by said devices is also evaluated, to determine whether said proposed modification requires further revision of said hierarchical representation.

12. The method of claim 11 which includes identifying a parent of said modified device, and evaluating the correlation between said modified device and said parent.

13. The method of claim 11 which includes
    identifying an orphan device that cannot be placed within said hierarchical representation and reporting said orphan device to the user of said monitoring system so that said user can select a location for said orphan device within said hierarchy,
    receiving said user's selected location for said orphan device in said hierarchical representation, and
    evaluating the correlation between said orphan device and a parent of said orphan device when placed in said selected location within said hierarchical representation to determine whether said selected location is correct.

14. The method of claim 11 in which said monitoring system is an electrical power monitoring system.

15. The method of claim 13 which includes identifying a parent of said orphan device, and evaluating the correlation between said orphan device and said parent.

16. The method of claim 13 in which said evaluation determines that said selected location is not correct, and which includes
    evaluating at least one type of information selected from the group consisting of (a) data measured by said devices and (b) configuration settings of said parent and its children, including said orphan device, to determine a potential reason why said selected location is incorrect, and reporting said potential reason to said user.

* * * * *